US009681398B2

(12) United States Patent
Uchiyama et al.

(10) Patent No.: US 9,681,398 B2
(45) Date of Patent: Jun. 13, 2017

(54) RADIO COMMUNICATION APPARATUS, COMMUNICATION CONTROL APPARATUS, RADIO COMMUNICATION METHOD AND COMMUNICATION CONTROL METHOD

(71) Applicant: SONY CORPORATION, Tokyo (JP)

(72) Inventors: Hiromasa Uchiyama, Kanagawa (JP); Ryo Sawai, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/027,382

(22) PCT Filed: Oct. 3, 2014

(86) PCT No.: PCT/JP2014/076623
§ 371 (c)(1),
(2) Date: Apr. 5, 2016

(87) PCT Pub. No.: WO2015/098228
PCT Pub. Date: Jul. 2, 2015

(65) Prior Publication Data
US 2016/0249302 A1 Aug. 25, 2016

(30) Foreign Application Priority Data

Dec. 24, 2013 (JP) ................................ 2013-265632

(51) Int. Cl.
*H04W 36/00* (2009.01)
*H04W 52/24* (2009.01)
(Continued)

(52) U.S. Cl.
CPC ....... *H04W 52/243* (2013.01); *H04J 11/0056* (2013.01); *H04W 28/048* (2013.01);
(Continued)

(58) Field of Classification Search
CPC ............. H04W 52/243; H04W 28/048; H04W 52/242; H04W 52/143; H04W 52/146; H04J 11/0056
(Continued)

(56) References Cited

U.S. PATENT DOCUMENTS

2006/0089148 A1* 4/2006 Zhao ..................... H04W 16/10
455/447
2007/0297366 A1* 12/2007 Osann ................... H04W 40/06
370/331
(Continued)

FOREIGN PATENT DOCUMENTS

JP 2010-533449 A 10/2010
JP 2012-503346 A 2/2012

OTHER PUBLICATIONS

"5G Radio Access, Research and Vision", Ericsson White Paper, 284 23-3204 Uen, Jun. 2013, 9 pages.
(Continued)

*Primary Examiner* — Dominic Rego
(74) *Attorney, Agent, or Firm* — Oblon, McClelland, Maier & Neustadt, L.L.P.

(57) ABSTRACT

[Object] To realize a mechanism for protecting a terminal connected to a small cell against harmful interference when idea of full-duplex radio communication is applied to a radio backhaul link and an access link of the small cell.
[Solution] Provided is a communication control apparatus including: a control unit configured to, when transmission from a base station to a master terminal on a radio backhaul link and transmission from the master terminal to a radio communication apparatus on an access link are executed on the same channel at the same time, control transmission power of the base station and transmission power of the master terminal so that the radio communication apparatus is able to cancel a second received signal due to transmission
(Continued)

on the radio backhaul link, the second received signal interfering with a first received signal on the access link, using an interference cancellation technique based on a received power difference.

17 Claims, 14 Drawing Sheets

(51) Int. Cl.
    *H04J 11/00*     (2006.01)
    *H04W 28/04*     (2009.01)
    *H04W 52/14*     (2009.01)

(52) U.S. Cl.
    CPC ........ *H04W 52/242* (2013.01); *H04W 52/143* (2013.01); *H04W 52/146* (2013.01)

(58) Field of Classification Search
    USPC .......... 455/424, 426.1, 435.2, 436–444, 449, 455/450; 370/328
    See application file for complete search history.

(56) References Cited

U.S. PATENT DOCUMENTS

| | | | |
|---|---|---|---|
| 2008/0090575 A1* | 4/2008 | Barak | H04W 16/10 455/444 |
| 2009/0017759 A1 | 1/2009 | Li et al. | |
| 2010/0009634 A1 | 1/2010 | Budianu et al. | |
| 2012/0142357 A1* | 6/2012 | Aminaka | H04W 36/0055 455/437 |
| 2012/0163335 A1* | 6/2012 | Chung | H04L 5/0023 370/330 |
| 2013/0094433 A1* | 4/2013 | Nagata | H04B 7/15542 370/315 |
| 2013/0102307 A1* | 4/2013 | Nagata | H04B 7/2606 455/434 |
| 2013/0286930 A1* | 10/2013 | Nagata | H04B 7/15542 370/315 |
| 2014/0153472 A1* | 6/2014 | Phan | H04L 5/0032 370/312 |

OTHER PUBLICATIONS

Achaleshwar Sahai, "Pushing the limits of Full-duplex: Design and Real-time Implementation", Department of Electrical and Computer Engineering, Rice University, Technical Report TREE1104, Jul. 4, 2011, 12 pages.
"Text Proposal for TR36.923 on Small Cell Enhancement Scenarios", NTT DOCOMO, 3GPP TSG RAN WG1 Meeting #72, R1-130748, Jan. 28-Feb. 1, 2013, 5 pages.
"Discussion on interference characteristics and evaluation assumption for various small cell scenarios", NEC Group, 3GPP TSG RAN WG1 Meeting #72, R1-130374, Jan. 28-Feb. 1, 2013, 4 pages.
"Techniques for D2D Communication", Qualcomm Incorporated, 3GPP TSG-RAN WG1 #73, R1-132504, May 2013, 13 pages.
"Evaluation results on coordination for SCE scenario 2a with non-ideal backhaul" Samsung, 3GPP TSG RAN WG1 Meeting #73, R1-131978, May 2013, 5 pages.
International Search Report issued on Jan. 6, 2015 for PCT/JP2014/076623 filed on Oct. 3, 2014.

* cited by examiner

FIG. 7

| | t1 | t2 | t3 |
|---|---|---|---|
| eNodeB Tx | $D_{t1}$ | $D_{t2}$ | $D_{t3}$ |
| Master Rx | $D_{t1}$ | $D_{t2}$ | $D_{t3}$ |
| Master Tx | | $D_{t1}$ | $D_{t2}$ |
| Slave Rx | $D_{t1}$ | $D_{t1}$ / $D_{t2}$ | $D_{t2}$ / $D_{t3}$ |

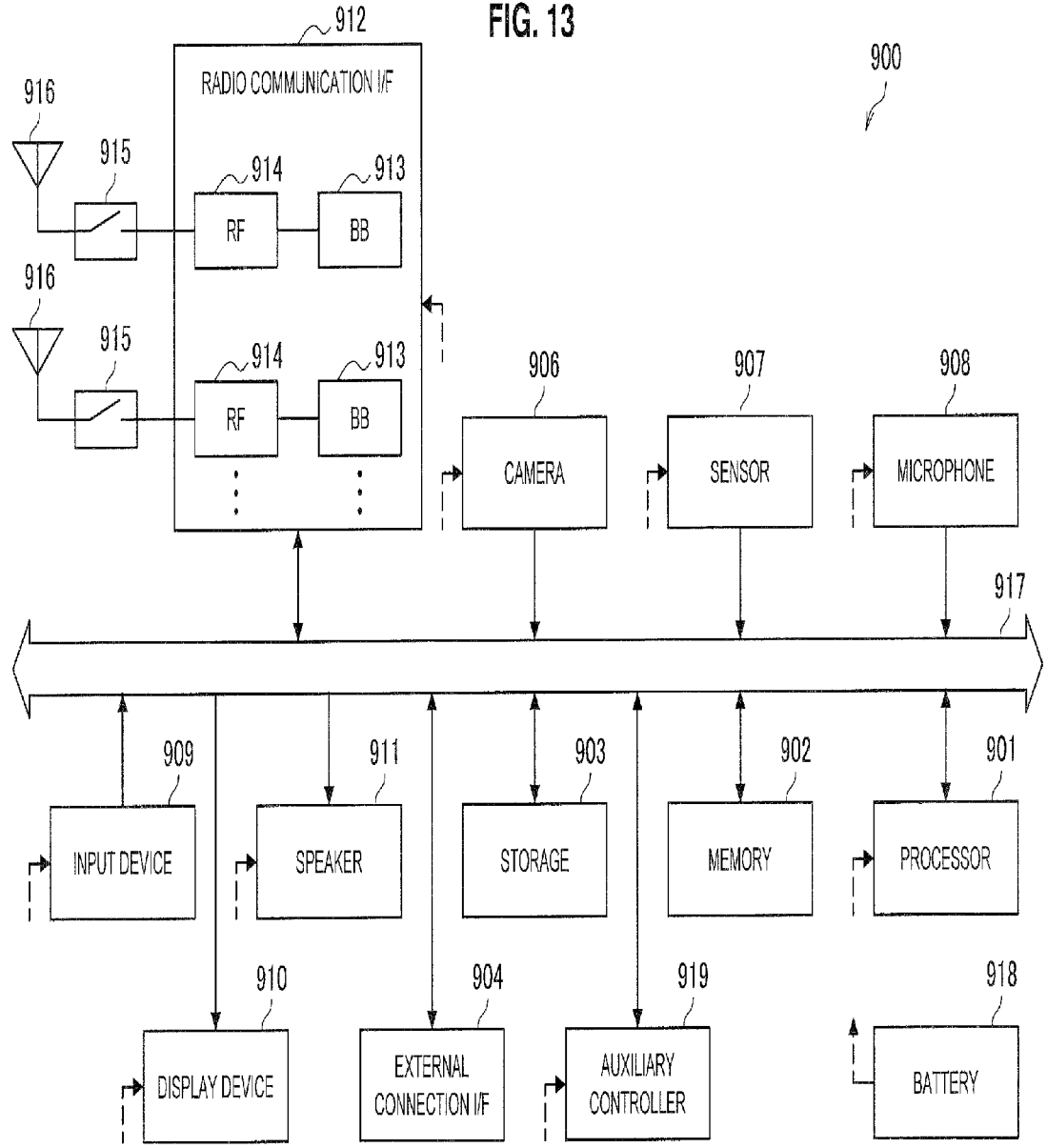

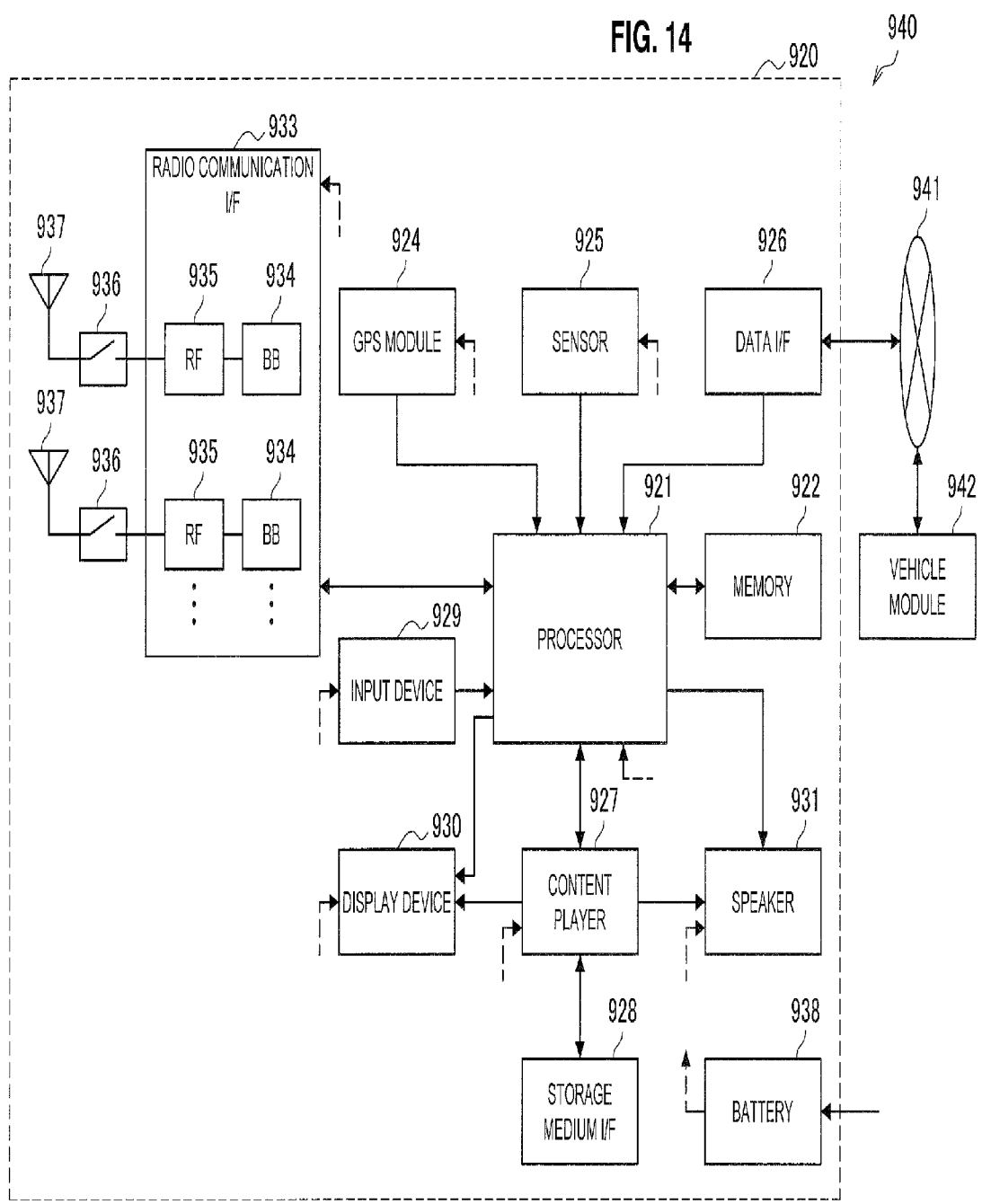

RADIO COMMUNICATION APPARATUS, COMMUNICATION CONTROL APPARATUS, RADIO COMMUNICATION METHOD AND COMMUNICATION CONTROL METHOD

TECHNICAL FIELD

The present disclosure relates to a radio communication apparatus, a communication control apparatus, a radio communication method and a communication control method.

BACKGROUND ART

A recent radio communication environment faces a problem of rapid increase of data traffic. Therefore, in 3GPP, as disclosed in the following Non-Patent Literature 1, it is studied to disperse traffic by increasing network density by providing a plurality of small cells within a macro cell. Such a technique which utilizes small cells is referred to as small cell enhancement. Also in proposal of the fifth generation wireless communication scheme, as disclosed in the following Non-Patent Literature 2, introduction of an ultra-dense network using higher and wider band than that of an existing network is forecasted.

A small cell is concept which can include various kinds of cells (such as, for example, a femtocell, a nano cell, a pico cell and a micro cell) which are disposed while overlapping with a macro cell and which are smaller than the macro cell. In one example, the small cell is operated by a dedicated base station. In another example, the small cell is operated by a terminal which becomes a master device temporarily operating as a small cell base station. A so-called relay node can be also regarded as one form of the small cell base station. In an environment where such small cells are operated, it is important to efficiently utilize radio resources and provide a low-cost device.

The small cell base station typically relays traffic between a macro cell base station and a terminal. A link between the small cell base station and the macro cell base station is referred to as a backhaul link. Further, a link between the small cell base station and the terminal is referred to as an access link. When the backhaul link is a radio link, by operating the radio backhaul link and the access link using a time division system, it is possible to avoid radio signals of these links from interfering with each other.

CITATION LIST

Non-Patent Literature

Non-Patent Literature 1: NTT DOCOMO, "Text Proposal for TR36.923 on Small Cell Enhancement Scenarios", 3GPP TSG RAN WG1 Meeting #72, R1-130748, Jan. 28-Feb. 1, 2013
Non-Patent Literature 2: Ericsson, "ERICSSON WHITE PAPER: 5G RADIO ACCESS", June 2013, [online], accessed Aug. 26, 2013. http://www.ericsson.com/res/docs/whitepapers/wp-5g.pdf
Non-Patent Literature 3: Achaleshwar Sahai, Gaurav Patel, Ashutosh Sabharwal, "Pushing the limits of Full-duplex: Design and Real-time Implementation", arXiv: 1107.0607, Mon, 4 Jul. 2011

SUMMARY OF INVENTION

Technical Problem

However, when a radio backhaul link and an access link are operated using a time division system at a small cell base station, latency for relaying traffic becomes long, which degrades utilization efficiency of radio resources. Further, a memory size required for the small cell base station to buffer the traffic becomes enormous. In contrast, if the radio backhaul link and the access link can be operated on the same channel at the same time by introducing idea of full-duplex radio communication as proposed in Non-Patent Literature 3 into the small cell base station, it is possible to utilize radio resources more efficiently. However, such operation causes not only self-interference due to wrap-around of a transmission signal at the small cell base station, but also harmful interference at a terminal connected to the small cell base station via the access link. The self-interference at the small cell base station can be cancelled by, for example, applying a self-interference cancellation technique described in Non-Patent Literature 3. On the other hand, an effective method for appropriately processing interference to a desired signal to be received on the access link, which is caused by transmission on the radio backhaul link, has not been proposed yet.

Therefore, technology according to the present disclosure is directed to realizing a mechanism for protecting a terminal connected to a small cell against harmful interference when idea of full-duplex radio communication is applied to a radio backhaul link and an access link of the small cell.

Solution to Problem

According to the present disclosure, there is provided a radio communication apparatus including: a radio communication unit configured to communicate via an access link with a master terminal connected to a base station via a radio backhaul link; and a signal processing unit configured to, when transmission on the radio backhaul link and transmission on the access link are executed on the same channel at the same time, cancel a second received signal due to transmission on the radio backhaul link, the second received signal interfering with a first received signal on the access link, using an interference cancellation technique based on a received power difference.

According to the present disclosure, there is provided a communication control apparatus including: a control unit configured to, when transmission from a base station to a master terminal on a radio backhaul link and transmission from the master terminal to a radio communication apparatus on an access link are executed on the same channel at the same time, control transmission power of the base station and transmission power of the master terminal so that the radio communication apparatus is able to cancel a second received signal due to transmission on the radio backhaul link, the second received signal interfering with a first received signal on the access link, using an interference cancellation technique based on a received power difference.

According to the present disclosure, there is provided a radio communication method in a radio communication apparatus which communicates via an access link with a master terminal connected to a base station via a radio backhaul link, the radio communication method including: when transmission on the radio backhaul link and transmission on the access link are executed on the same channel at the same time, cancelling a second received signal due to transmission on the radio backhaul link, the second received signal interfering with a first received signal on the access link, using an interference cancellation technique based on a received power difference.

According to the present disclosure, there is provided a communication control method including: when transmission from a base station to a master terminal on a radio backhaul link and transmission from the master terminal to a radio communication apparatus on an access link are executed on the same channel at the same time, controlling transmission power of the base station and transmission power of the master terminal by a communication control apparatus so that the radio communication apparatus is able to cancel a second received signal due to transmission on the radio backhaul link, the second received signal interfering with a first received signal on the access link, using an interference cancellation technique based on a received power difference.

Advantageous Effects of Invention

As described above, according to the present disclosure, when idea of full-duplex radio communication is applied to a radio backhaul link and an access link of a small cell, it is possible to protect a terminal connected to the small cell against harmful interference.

The above-described advantageous effects are not necessarily limitary, but any of the advantageous effects shown herein or another advantageous effect that can be grasped herein may be attained in combination with the above-described advantageous effects or instead of the above-described advantageous effects.

BRIEF DESCRIPTION OF DRAWINGS

FIG. 7 is a diagram illustrating an example of flow of data transmission and reception at a communication control system according to an embodiment of the present disclosure.

FIG. 13 is a block diagram illustrating an example of a schematic configuration of a smartphone to which the technology according to the present disclosure may be applied.

FIG. 14 is a block diagram illustrating an example of a schematic configuration of a car navigation device to which the technology according to the present disclosure may be applied.

DESCRIPTION OF EMBODIMENTS

Hereinafter, a preferred embodiment of the present disclosure will be described in detail with reference to the appended drawings. In this specification and the drawings, elements that have substantially the same function and structure are denoted with the same reference signs, and repeated explanation is omitted.

It should be noted that description will be provided in the following order.
1. Outline of System
1-1. Introduction of Small Cell
1-2. Adoption of Full-Duplex (FD) Mode
2. Configuration Example of Communication Control Apparatus
3. Configuration Example of Radio Communication Apparatus
4. Configuration Example of Terminal Apparatus
5. Operation Processing
5-1. Operation of the Whole System
5-2. Setting of FD Pair and Transmission Power Control by Control Entity
5-3. Interference Cancellation by Small Cell Terminal
6. Supplement
7. Application Example
7-1. Application Example Regarding Cooperative Control Node
7-2. Application Example Regarding Base Station
7-3. Application Example Regarding Terminal Apparatus

1. OUTLINE OF SYSTEM 1-1. Introduction of Small Cell

Figure 1:
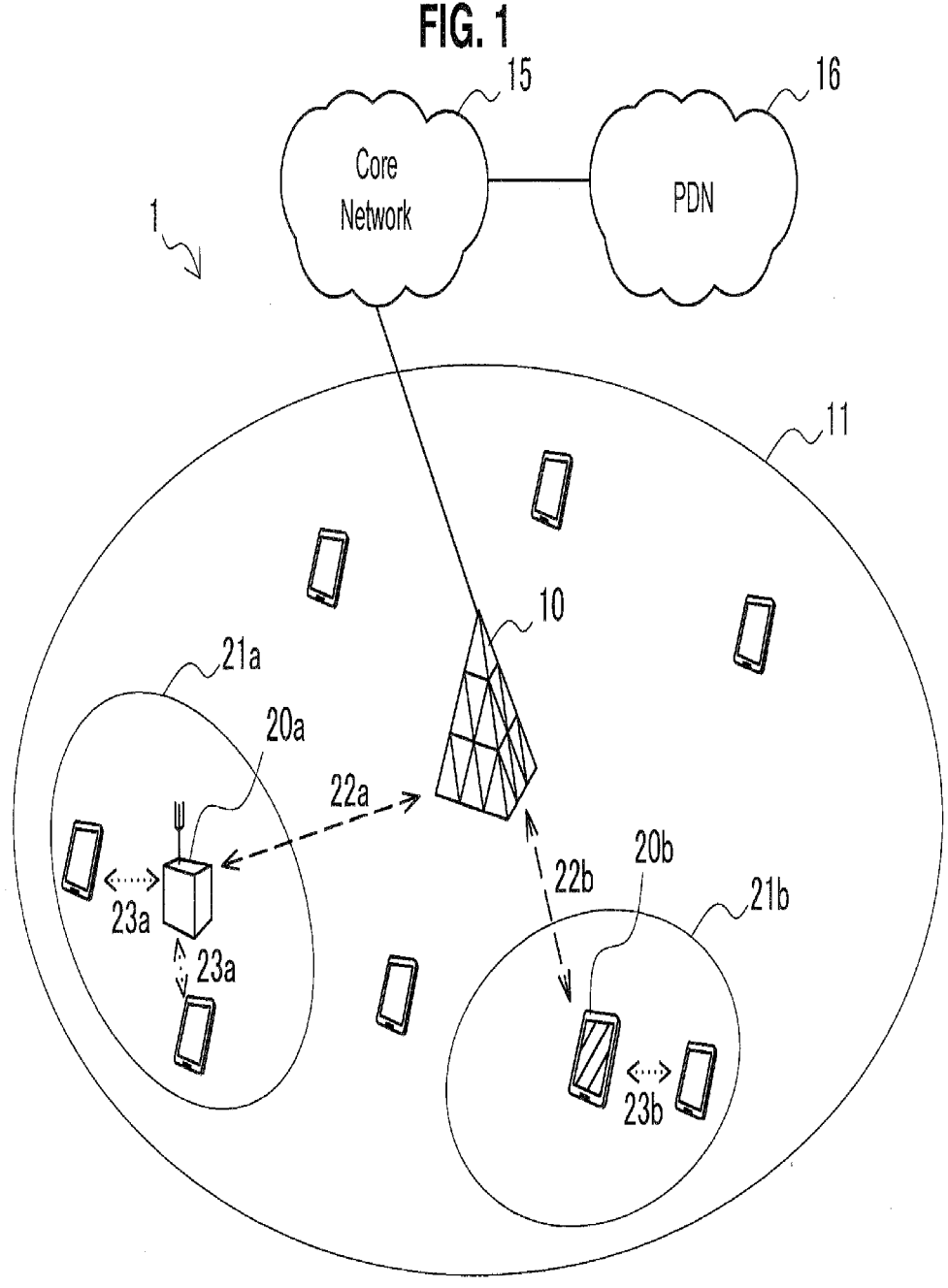
FIG. 1 is an explanatory diagram for explaining outline of a communication control system according to an embodiment of technology according to the present disclosure.

FIG. 1 is an explanatory diagram for explaining outline of a communication control system 1 according to an embodiment of technology according to the present disclosure. The communication control system 1 includes a communication control apparatus 10 and radio communication apparatuses 20a and 20b.

The communication control apparatus 10 is an apparatus which cooperatively controls radio communication in a macro cell and a small cell. In the example of FIG. 1, the communication control apparatus 10 is a macro cell base station. The macro cell base station 10 provides radio communication service to one or more terminal apparatuses located inside the macro cell 11. The macro cell base station 10 is connected to a core network 15. The core network 15 is connected to a packet data network (PDN) 16 via a gateway apparatus (not illustrated). The macro cell 11 may be operated according to an arbitrary wireless communication scheme such as, for example, long term evolution (LTE), LTE-advanced (LTE-A), GSM (registered trademark), UMTS, W-CDMA, CDMA200, WiMAX, WiMAX2 and IEEE802.16. It should be noted that the communication control system 1 is not limited to the example in FIG. 1, and a control node (an upper node of the macro cell base station) within the core network 15 or the PDN 16 may have a function of cooperatively controlling radio communication in the macro cell and the small cell.

The radio communication apparatuses 20a and 20b are respectively master devices which operate small cells. As an example, the radio communication apparatus 20a is a small cell base station which is fixedly provided. The small cell base station 20a respectively establishes a radio backhaul link 22a with the macro cell base station 10 and an access link 23a with one or more terminal apparatus within the small cell 21a. The radio communication apparatus 20b is a dynamic access point (AP). The dynamic AP 20b is a mobile device which dynamically operates the small cell 21b. The dynamic AP 20b respectively establishes a radio backhaul link 22b with the macro cell base station 10 and an access link 23b with one or more terminal apparatuses within the small cell 21b. The dynamic AP 20b may be, for example, a terminal apparatus in which hardware or software which can operate as a base station or a radio access point is mounted. The small cell 21b in this case is a localized network which is dynamically formed. The radio communication apparatuses 20a and 20b typically have authority to assign radio resources to terminal apparatuses connected to the radio communication apparatuses 20a and 20b. However, in the present embodiment, at least part of assignment of radio resources is delegated to the communication control apparatus 10 to implement cooperative control.

It should be noted that, in the present specification, when it is not necessary to distinguish between the radio communication apparatuses 20a and 20b, by omitting an alphabetical character at an end of the reference number, these are collectively referred to as a radio communication apparatus 20. The same also applies to other components (such as a small cell 21, a radio backhaul link 22 and an access link 23). The radio communication apparatus 20 is not limited to the example in FIG. 1, and may be an arbitrary kind of master device such as a relay station which relays radio signals at a layer 1, a layer 2 or a layer 3. Further, the radio communication apparatus 20 may have, for example, a separate wired backhaul link for control in addition to the radio backhaul link 22.

1-2. Adoption of Full-Duplex (FD) Mode

The radio communication apparatus 20 receives downlink traffic addressed to a terminal apparatus within the small cell 21 via the radio backhaul link 22 and transmits the received traffic to the terminal apparatus to which the traffic is addressed via the access link 23. Further, the radio communication apparatus 20 receives uplink traffic received from a terminal apparatus within the small cell 21 via the access link 23 and transmits the received traffic via the radio backhaul link 22. When reception on the radio backhaul link 22 and transmission on the access link 23 or reception on the access link 23 and transmission on the radio backhaul link 22 are executed using a time division system, a received signal and a transmission signal do not interfere with each other at the radio communication apparatus 20. However, such operation using the time division system increases latency for relaying traffic. A memory size required for buffering traffic at the master device becomes enormous. Further, it is possible to avoid the above-described interference between the received signal and the transmission signal also by assigning different frequency channels to the radio backhaul link and the access link. However, such operation using a frequency division system can be employed only in a situation where there are sufficient available frequency resources. In either system, it can be hardly said that utilization efficiency of radio resources is optimized. Therefore, in the present embodiment, a full-duplex (FD) mode is introduced to utilize radio resources more efficiently.

Figure 2:
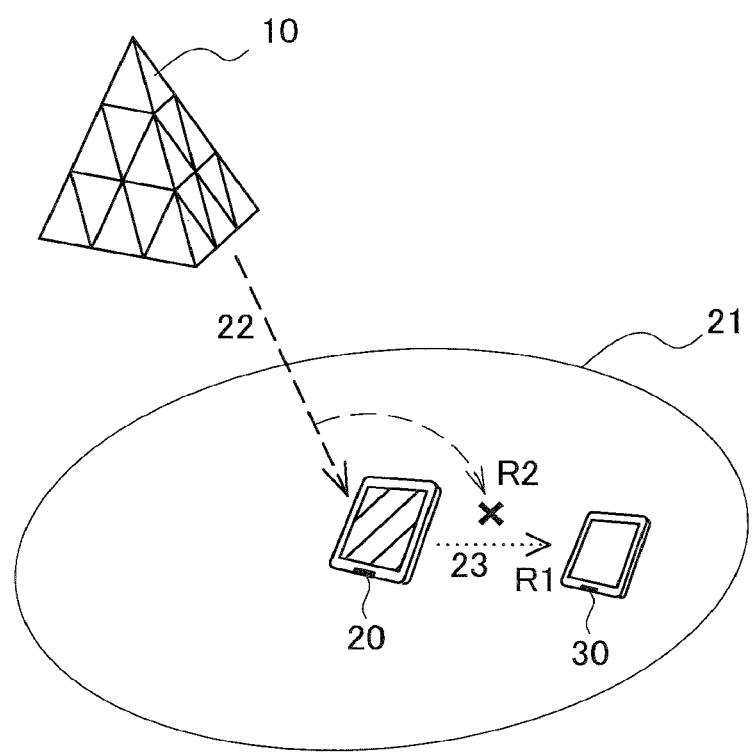
FIG. 2 is an explanatory diagram for explaining interference of a received signal at a terminal apparatus connected to a radio communication apparatus according to an embodiment of the present disclosure.

When the radio communication apparatus 20 operates in the FD mode, in downlink, transmission on the radio backhaul link 22 by the macro cell base station 10 (that is, reception by the radio communication apparatus 20) and transmission on the access link 23 by the radio communication apparatus 20 are executed on the same channel at the same time. So-called self-interference which is caused by a transmission signal emitted from a transmission antenna of the radio communication apparatus 20 wrapping around a reception antenna of the radio communication apparatus 20 can be cancelled by utilizing, for example, a self-interference canceller (SIC) technique described in Non-Patent Literature 3. However, when the radio communication apparatus 20 operates in the FD mode, there is a possibility that harmful interference may occur also at a terminal connected to the radio communication apparatus 20 via the access link. More specifically, at the terminal apparatus connected to the radio communication apparatus 20, a received signal due to transmission from the macro cell base station 10 on the radio backhaul link interferes with a received signal received from the radio communication apparatus 20 on the access link. FIG. 2 illustrates interference of received signals at the terminal apparatus connected to the radio communication apparatus 20. The terminal apparatus 30 is a slave terminal connected to the radio communication apparatus 20. As illustrated in FIG. 2, data included in a signal transmitted from the macro cell base station 10 to the radio communication apparatus 20 on the radio backhaul link 22 at time t is relayed by the radio communication apparatus 20 at time t+dt. The terminal apparatus 30 receives the data relayed by the radio communication apparatus 20 as a received signal R1 (first received signal). Meanwhile, there is a case where a received signal R2 (second received signal) due to transmission of a signal from the macro cell base station 10 to the radio communication apparatus 20 on the radio backhaul link 22 at time t+dt is received by the terminal apparatus 30 within the small cell 21. In this case, the received signal R2 interferes with the received signal RI.

As such a technique for cancelling interference when received signals interfere with each other, there is an interference cancellation technique based on a received power difference. The interference cancellation technique based on the received power difference also attracts attention as basic technology for non-orthogonal multiple access (NOMA) which is a multiplex system that enables a plurality of users to be multiplexed on frequency channels which are non-orthogonal to each other. For example, the interference cancellation technique based on the received power difference is disclosed in "Andreas Ruegg, and Alberto Tarable, "Iterative SIC receiver scheme for non-orthogonally superimposed signals on top of OFDMA", PIMRC, page 156-161. IEEE, (2010)". In the interference cancellation technique based on the received power difference, a transmission side performs multiplexing after controlling transmission power so that there is a predetermined received power difference between transmission signals to a plurality of terminals in the same frequency resource (or a closer frequency resource as orthogonality becomes less) at the same time. A reception side can separate and decode a desired signal using SIC by utilizing this received power difference. Therefore, in the present embodiment, as will be described in detail from the next section, the terminal apparatus 30 obtains a desired signal by cancelling interference between the received signals from the macro cell base station 10 and the radio communication apparatus 20 using the interference cancellation technique based on the received power difference.

In uplink, when the radio communication apparatus 20 operates in the FD mode, transmission on the access link 23 by the terminal apparatus 30 and transmission on the radio backhaul link 22 by the radio communication apparatus 20 (that is, reception by the macro cell base station 10) are executed on the same channel at the same time. However, normally, transmission power of a radio signal transmitted on the access link 23 by the terminal apparatus 30 is not large enough to provide harmful interference to the macro cell base station 10. Therefore, in the present specification, how to cancel interference between received signals caused at the slave terminal in the FD mode in downlink will be mainly described. It should be noted that the technology according to the present disclosure may be also utilized to cancel interference in uplink.

By the way, when the terminal apparatus 30 which is a slave device can use the interference cancellation technique based on the received power difference, the radio communication apparatus 20 may adopt NOMA as a multiplex system. In a similar manner, when the macro cell terminal and the radio communication apparatus 20 can use the interference cancellation technique based on the received power difference, the macro cell base station 10 may adopt NOMA in a communication scheme as a multiplex system. That is, the macro cell base station 10 or the radio communication apparatus 20 may perform multiplexing after controlling transmission power so that there is a predetermined received power difference between transmission signals to the plurality of terminals in the same frequency resource at the same time. The following Table 1 indicates an example of combination of multiplex systems in the backhaul link and the access link.

20 can be also synchronized with the macro cell 11 by searching for the synchronization signal. The reference signal is used to measure communication quality. The communication quality measured using the reference signal becomes, for example, an index for handover determination which triggers handover between macro cells or between a macro cell and a small cell.

Further, the radio communication unit 110 establishes the radio backhaul link 22 with the radio communication apparatus 20 which operates the small cell 21 within the macro cell 11. For example, uplink traffic transmitted from the terminal apparatus (hereinafter, referred to as a "small cell terminal") connected to the small cell 21 is relayed by the radio communication apparatus 20 and received by the radio communication unit 110 on the radio backhaul link 22. Further, the radio communication unit 110 transmits downlink traffic addressed to the small cell terminal to the radio communication apparatus 20 on the radio backhaul link 22. The downlink traffic is relayed to the small cell terminal to which the downlink traffic is addressed by the radio communication apparatus 20. Exchange of control messages between the communication control apparatus 10 and the radio communication apparatus 20 is also performed on the radio backhaul link 22.

(2) Network Communication Unit

The network communication unit 120 is a communication interface for connecting the communication control apparatus 10 to the core network 15. The network communication unit 120 may be a wired communication interface or a radio communication interface. The network communication unit 120 transmits and receives data traffic and exchanges control messages with various control nodes within the core network 15.

(3) Storage Unit

The storage unit 130 stores a program and data for operation of the communication control apparatus 10 using a storage medium such as a hard disk and a semiconductor

TABLE 1

| Type | 1-1 | 1-2 | 1-3 | 2-1 | 2-2 | 2-3 | 3-1 | 3-2 | 3-3 |
|---|---|---|---|---|---|---|---|---|---|
| Backhaul link | NOMA + OFDMA | NOMA + OFDMA | NOMA + OFDMA | OFDMA | OFDMA | OFDMA | NOMA + OFDMA | NOMA + OFDMA | NOMA + OFDMA |
| Access link | OFDMA | SCFDMA | CDMA | NOMA + OFDMA | NOMA + SCFDMA | NOMA | NOMA + OFDMA | NOMA + SCFDMA | NOMA |

2. CONFIGURATION EXAMPLE OF COMMUNICATION CONTROL APPARATUS

Figure 3:
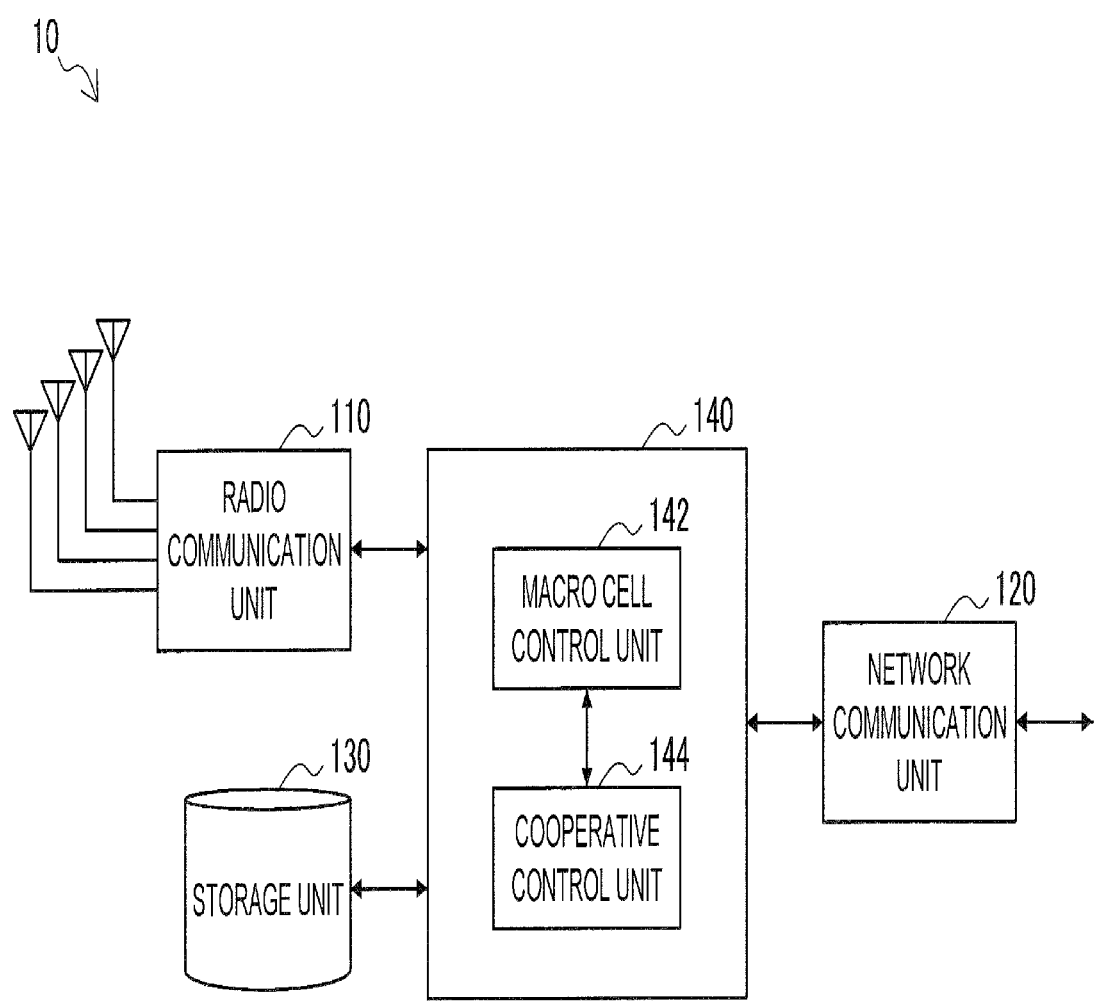
FIG. 3 is a block diagram illustrating an example of a logical configuration of a communication control apparatus according to an embodiment of the present disclosure.

FIG. 3 is a block diagram illustrating an example of a logical configuration of the communication control apparatus 10 according to the present embodiment. Referring to FIG. 3, the communication control apparatus 10 includes a radio communication unit 110, a network communication unit 120, a storage unit 130 and a control unit 140.

(1) Radio Communication Unit

The radio communication unit 110 executes radio communication with a terminal apparatus (hereinafter, referred to as a "macro cell terminal") connected to the macro cell 11. For example, the radio communication unit 110 receives uplink traffic from the macro cell terminal and transmits downlink traffic to the macro cell terminal. Further, the radio communication unit 110 broadcasts a synchronization signal and a reference signal in downlink. The synchronization signal is used by the macro cell terminal to be synchronized with the macro cell 11. The radio communication apparatus memory. The data stored by the storage unit 130 can include, for example, macro cell information (such as location, a cell radius, an antenna configuration and operation frequency band of the macro cell base station), master device information (such as a device ID, a device type and location) and small cell information (such as a cell radius and the number of small cell terminals) collected from the radio communication apparatus 20, slave device information (such as capability information which will be described later) and various control parameters (such as transmission power information which will be described later).

(4) Control Unit

The control unit 140 controls the whole operation of the communication control apparatus 10. In the present embodiment, the control unit 140 includes a macro cell control unit 142 and a cooperative control unit 144.

(4-1) Macro Cell Control Unit

The macro cell control unit 142 controls radio communication with the macro cell terminal by the radio communication unit 110. The macro cell control unit 142, for example, generates system information such as operation frequency band and an antenna configuration of the macro cell 11, and causes the radio communication unit 110 to broadcast the generated system information. Further, the macro cell control unit 142 assigns radio resources for respective macro cell terminals and execute transmission power control and retransmission control. Further, the macro cell control unit 142 determines power indicated in transmission power information determined by the cooperative control unit 144 which will be described later as transmission power of a transmission signal to be transmitted by the radio communication unit 110. The macro cell control unit 142 transfers uplink traffic inputted from the radio communication unit 110 to the network communication unit 120. Further, the macro cell control unit 142 transfers downlink traffic inputted from the network communication unit 120 to the radio communication unit 110.

Further, the macro cell control unit 142 controls retransmission in radio communication with the radio communication apparatus 20. For example, the macro cell control unit 142 transmits next data or retransmits the same data according to an ACK response or a NACK response from the radio communication apparatus 20.

(4-2) Cooperative Control Unit

The cooperative control unit 144 is control entity which controls utilization of the radio backhaul link and the access link by the communication control apparatus 10 and the radio communication apparatus 20 to promote efficient radio communication utilizing one or more small cells 21. For example, the cooperative control unit 144 determines whether the radio communication apparatus 20 should execute radio communication in the FD mode. When the cooperative control unit 144 determines that the radio communication apparatus 20 should execute radio communication in the FD mode, the cooperative control unit 144 instructs the radio communication apparatus 20 to operate in the FD mode. On the other hand, when the cooperative control unit 144 determines that the radio communication apparatus 20 should not execute radio communication in the FD mode, the cooperative control unit 144 instructs the radio communication apparatus 20 to operate in a non-FD mode.

When radio communication is executed in the FD mode, transmission on the radio backhaul link 22 and transmission on the access link 23 are executed on the same channel at the same time. In this case, the cooperative control unit 144 controls transmission power of the communication control apparatus 10 and transmission power of the radio communication apparatus 20. For details, the cooperative control unit 144 controls transmission power so that the terminal apparatus 30 can cancel the received signal R2 due to transmission on the radio backhaul link 22, which interferes with the received signal RI on the access link 23, using the interference cancellation technique based on the received power difference. Control of the transmission power by the cooperative control unit 144 will be described below with reference to FIG. 4.

Figure 4:
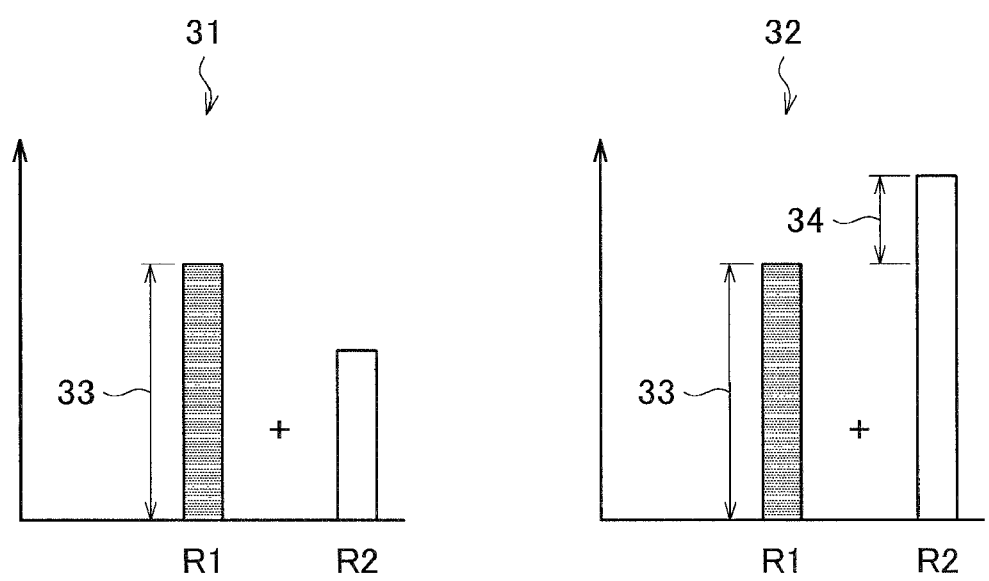
FIG. 4 is an explanatory diagram for explaining an interference cancellation technique based on a received power difference according to an embodiment of the present disclosure.

FIG. 4 is an explanatory diagram for explaining the interference cancellation technique based on the received power difference. FIG. 4 illustrates received power for each signal component included in a synthesis signal received by the terminal apparatus 30. As described above, the received signal R1 is a desired signal component for the terminal apparatus 30. The received signal R2 is an interference component. In the case indicated with reference numeral 31 in FIG. 4, while, because the received signal R1 has received power 33 required for the terminal apparatus 30 to decode the signal, the received signal can be decoded, received power of the received signal R2 is sufficiently smaller than the received power 33 of the received signal R1. Therefore, the terminal apparatus 30 can decode the received signal R1 which is a desired signal without cancelling the received signal R2. On the other hand, in the case indicated with reference numeral 32 in FIG. 4, the received signal R1 and the received signal R2 have the received power 33. The received power of the received signal R1 is smaller than the received power of the received signal R2. Therefore, the terminal apparatus 30 needs to cancel interference by the received signal R2. Here, when a received power difference 34 between the received signal R1 and the received signal R2 is equal to or greater than a threshold, the terminal apparatus 30 can separate respective received signals from each other. Therefore, the cooperative control unit 144 controls transmission power of the communication control apparatus 10 and transmission power of the radio communication apparatus 20 so that the received power difference 34 between the received signal R1 and the received signal R2 becomes equal to or greater than the threshold.

At this time, the cooperative control unit 144 determines which of the received power of the received signal R1 and the received power of the received signal R2 should be set larger by comparing a channel state of the radio backhaul link 22 with a channel state of the access link 23. Here, the channel state includes a distance or path loss between nodes at both ends of each link, and channel quality of each link. As described above, when the received power difference 34 between the received signal R1 and the received signal R2 is equal to or greater than the threshold, the terminal apparatus 30 can separate the respective received signals from each other by first demodulating a signal with larger received power, and, then, modulating the demodulated signal again as necessary and cancelling the modulation signal from the synthesis signal. At that time, the cooperative control unit 144 sets magnitude relationship so that a received power difference can be easily provided by comparing the channel state of the radio backhaul link 22 with the channel state of the access link 23. For example, when a distance (path loss) between the communication control apparatus 10 and the terminal apparatus 30 is shorter (smaller) than a distance (path loss) between the radio communication apparatus 20 and the terminal apparatus 30, the cooperative control unit 144 may determine that the received power of the received signal R2 should be set larger, and, in an opposite case, may determine that the received power of the received signal R1 should be set larger. Further, when channel quality of a direct link between the communication control apparatus 10 and the terminal apparatus 30 is favorable compared to channel quality of the access link between the radio communication apparatus 20 and the terminal apparatus 30, the cooperative control unit 144 may determine that the received power of the received signal R2 should be set larger, and, in an opposite case, may determine that the received power of the received signal R1 should be set larger. The channel quality of these links can be recognized by, for example, acquiring a measurement report transmitted from the terminal apparatus 30. The cooperative control unit 144 can efficiently realize a received power difference equal to or greater than the threshold at the terminal apparatus 30 by setting such magnitude relationship.

Further, the cooperative control unit 144 determines transmission power of the communication control apparatus 10 and transmission power of the radio communication apparatus 20 based on the above-described setting of the magnitude relationship and the channel states of the radio backhaul link 22 and the access link 23. The cooperative control unit 144 notifies each of the macro cell control unit 142 and the radio communication apparatus 20 of transmission power information indicating the determined transmission power value. Further, the cooperative control unit 144 notifies the terminal apparatus 30 of a message indicating which of the received power of the received signal R1 and the received power of the received signal R2 is larger. This message may include, for example, a flag indicating magnitude relationship or information indicating a received power value of the received signal R1 and a received power value of the received signal R2. The cooperative control unit 144 may transmit this message to the radio communication apparatus 20 and cause the radio communication apparatus 20 to transmit this message to the terminal apparatus 30. By this means, when a signal component with larger received power is an interference signal, the terminal apparatus 30 can acquire a desired signal by cancelling the interference signal based on the received power difference. Further, when a signal component with larger received power is a desired signal, the terminal apparatus 30 can acquire a desired signal without performing signal processing for cancelling the interference signal.

Processing of controlling transmission power by the cooperative control unit 144 has been described above. The cooperative control unit 144 can realize both improvement of utilization efficiency of radio resources in FD communication and acquisition of a desired signal at the terminal apparatus 30 by controlling transmission power. Subsequently, processing for determining whether or not the cooperative control unit 144 performs the above-described transmission power control will be described.

First, the cooperative control unit 144 determines whether or not load information indicating at least one of a traffic amount, the number of terminals and a resource usage rate indicates load exceeding a threshold. For example, when an amount of traffic to be processed exceeds the threshold, when the total number of macro cell terminals and small cell terminals or the number of small cell terminals exceeds the threshold, or when the resource usage rate exceeds the threshold, capacity of small cells should be increased by utilizing the FD mode. Therefore, when the above-described load information indicates load exceeding the threshold, the cooperative control unit 144 determines that transmission on the radio backhaul link 22 and the access link 23 should be executed on the same channel at the same time. That is, in this case, the cooperative control unit 144 selects the FD mode as an operation mode of the radio communication apparatus 20. On the other hand, when it is not determined that the capacity of small cells should be increased, the cooperative control unit 144 selects the non-FD mode as the operation mode of the radio communication apparatus 20. It should be noted that the cooperative control unit 144 can acquire the above-described load information by acquiring a monitoring result of a traffic amount, the number of active terminals and a resource usage rate at at least one of the communication control apparatus 10 and the radio communication apparatus 20.

When the FD mode is selected, the cooperative control unit 144 further selects candidates for a terminal apparatus which receives a signal on the access link to be transmitted in the FD mode based on capability information indicating whether one or more terminal apparatuses 30 connected to the radio communication apparatus 20 can each use the interference cancellation technique based on the received power difference. The candidates selected here are terminals which can use the interference cancellation technique based on the received power difference. The cooperative control unit 144 selects an appropriate terminal apparatus 30 which should receive the received signal R1 (that is, the terminal apparatus 30 with which radio communication should be performed in the FD mode) from terminals which can use the interference cancellation technique based on the received power difference further based on the channel states of the access link 23 and the channel states of the radio backhaul link 22 of these terminals. For example, the cooperative control unit 144 selects the terminal apparatus 30 which is in positional relationship or radio wave conditions which can easily cause the received power difference described above with reference to FIG. 4, for example, in the positional relationship or the radio wave conditions where there is a large difference in the channel states between the radio backhaul link 22 and the access link 23.

3. CONFIGURATION EXAMPLE OF RADIO COMMUNICATION APPARATUS

Figure 5:
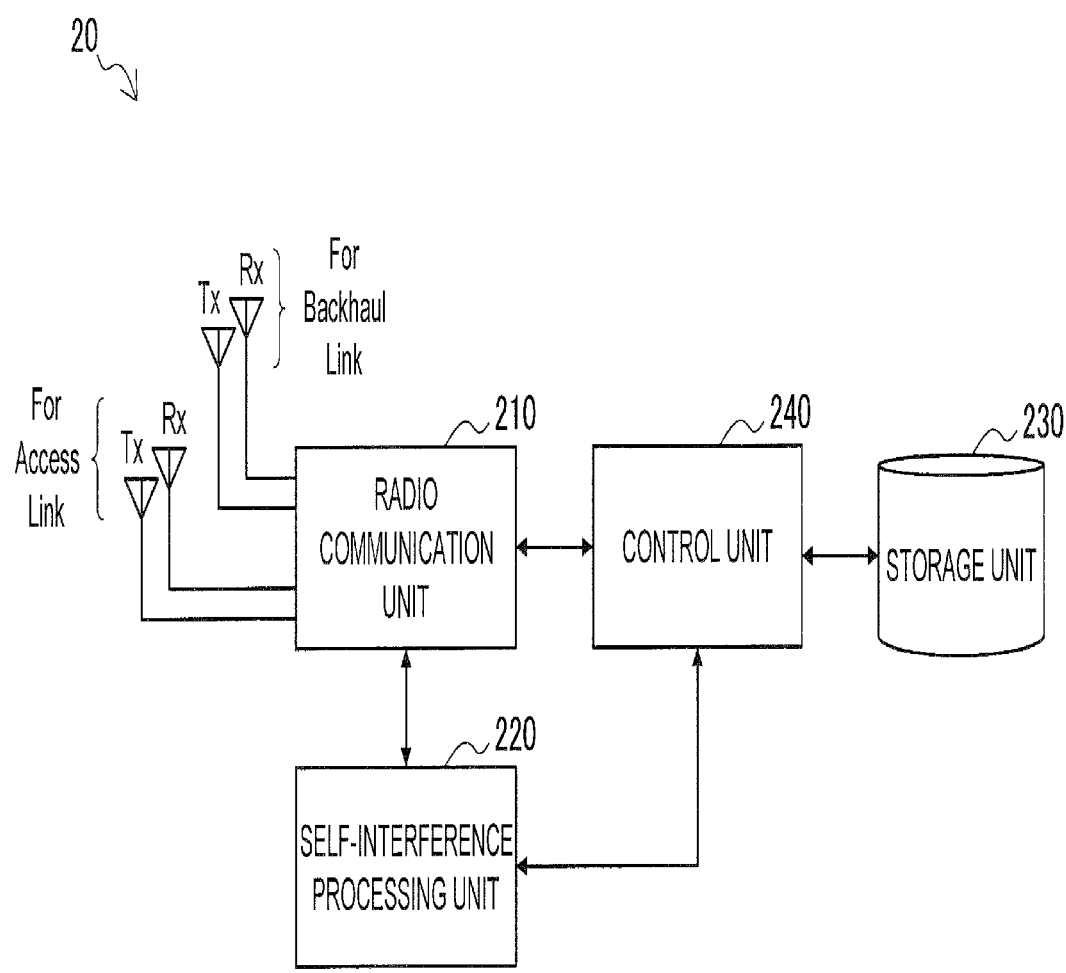
FIG. 5 is a block diagram illustrating an example of a logical configuration of a radio communication apparatus according to an embodiment of the present disclosure.

FIG. 5 is a block diagram illustrating an example of a logical configuration of the radio communication apparatus 20 according to the present embodiment. Referring to FIG. 5, the radio communication apparatus 20 includes a radio communication unit 210, a self-interference processing unit 220, a storage unit 230 and a control unit 240.

(1) Radio Communication Unit

The radio communication unit 210 establishes the access link 23 with one or more small cell terminals (slave devices) within the small cell 21 and communicates with the small cell terminals on the access link 23. Further, the radio communication unit 210 establishes the radio backhaul link 22 with the macro cell base station 10 and communicates with the macro cell base station 10 on the radio backhaul link 22. As illustrated in FIG. 5, the radio communication unit 210 has at least four antennas, among them, two antennas are used for the access link 23, and the other two antennas are used for the radio backhaul link 22. One of the two antennas for the access link 23 is used for downlink transmission, and the other one is used for uplink reception. One of the two antennas for the radio backhaul link 22 is used for downlink reception, and the other one is used for uplink transmission.

In the present embodiment, the radio communication unit 210 operates in either the above-described full-duplex (FD) mode or non-FD mode. When the FD mode is set by the control unit 240 which will be described later, the radio communication unit 210 receives a downlink signal at the reception antenna for the radio backhaul link 22, and, at the same time, transmits the downlink signal at the transmission antenna for the access link 23 on the same channel. By this means, transmission on the radio backhaul link 22 by the macro cell base station 10 and transmission on the access link 23 by the radio communication apparatus 20 are executed on the same channel at the same time. In a similar manner, concerning an uplink signal, the radio communication unit 210 receives an uplink signal at the reception antenna for the access link 23, and, at the same time, transmits the uplink signal at the transmission antenna for the radio backhaul link 22 on the same channel. By this means, transmission on the access link 23 by the terminal apparatus 30 and transmission on the radio backhaul link 22 by the radio communication apparatus 20 are executed on the same channel at the same time. When the non-FD mode is set by the control unit 240 which will be described later, the radio communication unit 210 uses different resources in one or both of time resources and frequency resources for reception and transmission (transmission and reception) on the radio backhaul link 22 and on the access link 23.

It should be noted that the antenna configuration described here is merely an example. Some antennas may be shared, and more antennas than those illustrated may be used. For example, the radio communication unit 210 may have one antenna for the access link 23 shared between downlink transmission and uplink reception and one antenna for the radio backhaul link 22 shared between downlink reception and uplink transmission.

(2) Self-Interference Processing Unit

The self-interference processing unit 220 cancels self-interference due to wraparound of a transmission signal from a received signal when radio communication in the FD mode is executed at the radio communication unit 210. The self-interference processing unit 220 can acquire a desired received signal from which self-interference is cancelled by, for example, subtracting a product of a channel response of a wraparound channel and a replica of a transmission signal from the received signal. It should be noted that the self-interference processing unit 220 may cancel self-interference by utilizing an arbitrary publicly known SIC technique, while details of the processing will not be described here. The self-interference processing unit 220 may apply the SIC technique to one of two systems of downlink and uplink or may apply the SIC technique to both systems.

(3) Storage Unit

The storage unit 230 stores a program and data for operation of the radio communication apparatus 20 using a storage medium such as a hard disk and a semiconductor memory. The data stored by the storage unit 230 can include, for example, master device information of the radio communication apparatus 20 and small cell information of the small cell 21 operated by the radio communication apparatus 20. Further, the data stored by the storage unit 230 can include various control information (such as operation mode information, setting information indicating magnitude relationship of the received power at the terminal apparatus 30 and transmission power information) signaled from the communication control apparatus 10.

(4) Control Unit

The control unit 240 controls radio communication executed by the radio communication unit 210. Further, the control unit 240 also controls radio communication executed by one or more small cell terminals connected to the small cell 21. When, for example, it is instructed from the communication control apparatus 10 to operate in the FD mode, the control unit 240 sets the operation mode of the radio communication unit 210 to the FD mode. Further, when it is instructed from the communication control apparatus 10 to operate in the non-FD mode, the control unit 240 sets the operation mode of the radio communication unit 210 to the non-FD mode.

The control unit 240 performs radio communication with the small cell terminals based on control by the communication control apparatus 10. For example, the control unit 240 controls the radio communication unit 210 so as to transmit a message indicating the operation mode (the FD mode or the non-FD mode) of the radio communication unit 210 to the terminal apparatus 30. When the radio communication unit 210 operates in the FD mode, the control unit 240 sets power indicated in transmission power information received from the communication control apparatus 10 as transmission power of a transmission signal to be transmitted by the radio communication unit 210. By the macro cell base station 10 and the radio communication apparatus 20 setting the power of the transmission signals according to the transmission power information determined by the communication control apparatus 10, the above-described received power difference occurs at the terminal apparatus 30. Further, when the radio communication unit 210 operates in the FD mode, the control unit 240 controls the radio communication unit 210 to transmit a message indicating magnitude relationship of the received power to the terminal apparatus 30. By this means, the terminal apparatus 30 can cancel interference based on the received signal difference. It should be noted that the message indicating the magnitude relationship of the received power may be the same message as the above-described message indicating the operation mode, or a different message.

Further, the control unit 240 performs retransmission control in radio communication with the terminal apparatus 30. For example, the control unit 240 transmits the next data or retransmits the same data according to an ACK response or a NACK response from the small cell terminal 30.

4. CONFIGURATION EXAMPLE OF TERMINAL APPARATUS

Figure 6:
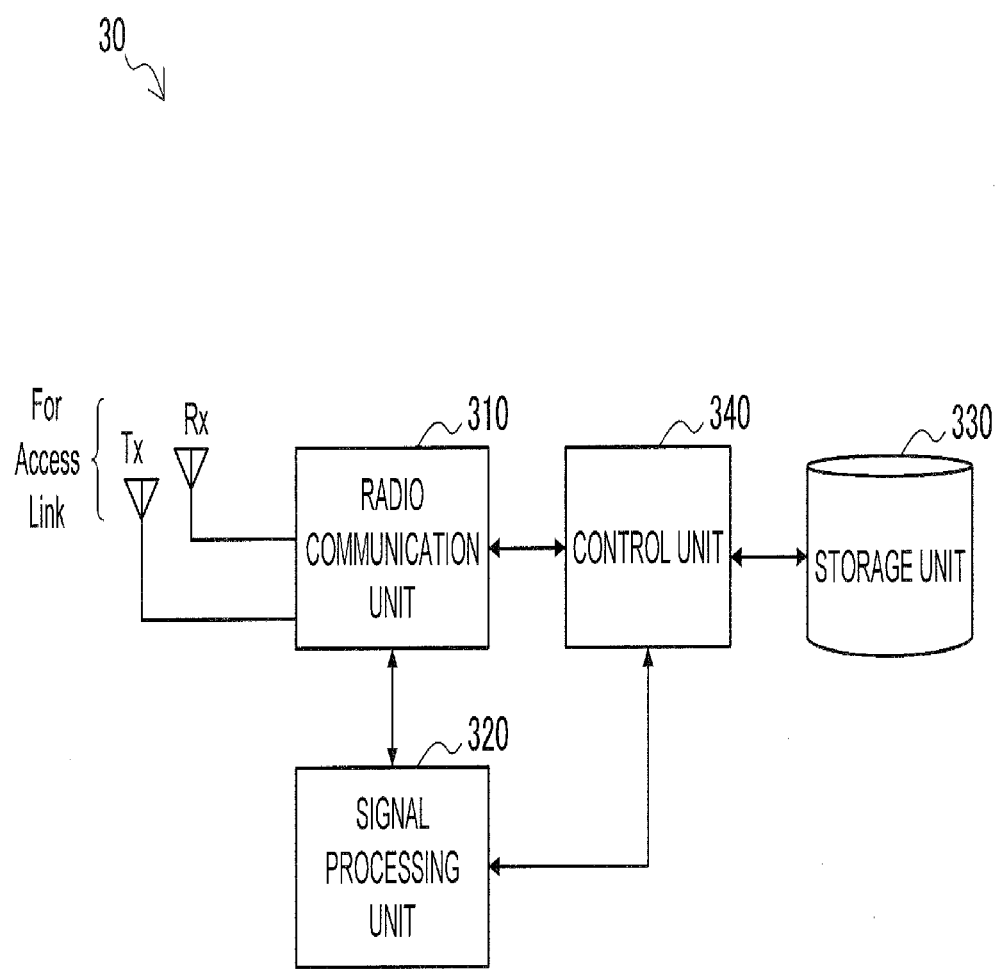
FIG. 6 is a block diagram illustrating an example of a logical configuration of a terminal apparatus according to an embodiment of the present disclosure.

FIG. 6 is a block diagram illustrating an example of a logical configuration of the terminal apparatus 30 according to the present embodiment. Referring to FIG. 6, the terminal apparatus 30 includes a radio communication unit 310, a signal processing unit 320, a storage unit 330 and a control unit 340.

(1) Radio Communication Unit

The radio communication unit 310 establishes the access link 23 with the radio communication apparatus 20 which is a master device of the small cell 21, and communicates with the radio communication apparatus 20 on the access link 23. As illustrated in FIG. 2, when the radio communication apparatus 20 operates in the FD mode, the radio communication unit 310 can receive a received signal on the access link 23 and a received signal due to transmission from the macro cell base station 10 to the radio communication apparatus 20 on the radio backhaul link 22. These received signals are received as a synthesis signal by the radio communication unit 310. As illustrated in FIG. 6, the radio communication unit 310 has two antennas for the access link 23, one of them is used for downlink reception, and the other is used for uplink transmission. It should be noted that the antenna configuration illustrated in FIG. 6 is merely an example. For example, the radio communication unit 310 may have the same antenna configuration as that of the radio communication unit 210 of the radio communication apparatus 20 illustrated in FIG. 5 and may be able to operate as the master device.

(2) Signal Processing Unit

When the radio communication apparatus 20 operates in the FD mode, the signal processing unit 320 cancels the received signal due to transmission by the macro cell base station 10 on the radio backhaul link 22, which interferes with the received signal on the access link 23, using the interference cancellation technique based on the received power difference. As described above with reference to FIG. 4, when the received power of the received signal of an interference signal is smaller than the received power of a desired signal, the signal processing unit 320 can acquire the desired signal by demodulating the received signal without cancelling the interference signal from the signal received by the radio communication unit 310. On the other hand, when the received power of the interference signal is larger than the received power of the desired signal, the signal processing unit 320 cancels the interference signal from the synthesis signal received by the radio communication unit 310. As described above, the transmission power by the communication control apparatus 10 and the radio communication apparatus 20 is controlled by the communication control apparatus 10 so that the received power difference between the desired signal and the interference signal becomes equal to or greater than a threshold. Further, magnitude relationship of the received power of the desired signal and the interference signal is known by the control unit 340 which will be described later. Therefore, the signal processing unit 320 first demodulates the interference signal whose received power is larger than that of the desired signal by equal to or greater than the threshold, modulates the demodulated interference signal again, cancels the modulation signal from the synthesis signal and can thereby demodulate the desired signal from the signal from which the modulation signal is cancelled. A specific circuit configuration of the signal processing unit 320 for such interference cancellation is described in, for example, "Shi Cheng, and Ravi Narasimhan, "Soft interference cancellation receiver for SC-FDMA uplink in LTE", WCNC, page 3318-3322, IEEE, (2013)".

(3) Storage Unit

The storage unit 330 stores a program and data for operation of the terminal apparatus 30 using a storage medium such as a hard disk and a semiconductor memory. The data stored by the storage unit 330 can include, for example, capability information indicating that the terminal apparatus 30 can use the interference cancellation technique based on the received power difference, and various control information (such as operation mode information and setting information indicating magnitude relationship of the received power) signaled from the communication control apparatus 10 or the radio communication apparatus 20.

(4) Control Unit

The control unit 340 controls radio communication executed by the radio communication unit 310. For example, the control unit 340 causes the terminal apparatus 30 to be connected to a cell selected through cell selection procedure. When the terminal apparatus 30 is connected to the small cell 21, the control unit 340 transmits the capability information stored by the storage unit 330 to the radio communication apparatus 20 which is a master device of the small cell 21 via the radio communication unit 310. This capability information is transmitted from the radio communication apparatus 20 to the communication control apparatus 10. The communication control apparatus 10 then recognizes that the terminal apparatus 30 can receive a signal transmitted on the access link in the FD mode based on this capability information.

Further, the control unit 340 causes the radio communication unit 310 to transmit an uplink signal and receive a downlink signal according to scheduling information received from the radio communication apparatus 20. When the radio communication apparatus 20 operates in the FD mode in downlink, the control unit 340 receives a message indicating a control result by the communication control apparatus 10 (a message indicating the operation mode and magnitude relationship of the received power) via the radio communication unit 310. The control unit 340 then determines which of the received power of the desired signal and the received power of the interference signal is larger based on the received message. When the received power of the interference signal is larger than the received power of the desired signal, the control unit 340 causes the signal processing unit 320 to cancel the interference signal from the synthesis signal received by the radio communication unit 310 and demodulate the desired signal from the signal from which the interference signal is cancelled.

Further, the control unit 340 performs retransmission control in radio communication with the radio communication apparatus 20. For example, the control unit 340 transmits an ACK response or a NACK response to the radio communication apparatus 20 based on whether or not data is successfully decoded from the signal received from the radio communication apparatus 20.

The configuration example of the terminal apparatus 30 has been described above. Subsequently, signal reception by the radio communication unit 310 and interference cancellation by the signal processing unit 320 will be described with reference to FIG. 7 with description of flow of data transmission and reception of the whole communication control system 1.

FIG. 7 is a diagram illustrating an example of flow of data transmission and reception in the communication control system 1. FIG. 7 illustrates transmission by the communication control apparatus 10 as "eNodeB Tx", reception by the radio communication apparatus 20 as "Master Rx", transmission by the radio communication apparatus 20 as "Master Tx" and reception by the terminal apparatus 30 as "Slave Rx". Each column in the drawing corresponds to, for example, a time slot, and time passes from a left side to a right side. First, at time t1, a signal which transfers data $D_{t1}$ transmitted to the radio communication apparatus 20 by the communication control apparatus 10 is received as a desired signal by the radio communication apparatus 20, and, as indicated with a dotted line in the drawing, is received as an interference signal by the terminal apparatus 30. In this case, the signal processing unit 320 discards the signal received by the radio communication unit 310. Subsequently, at time t2, the communication control apparatus 10 transmits a signal which transfers data $D_{t2}$ to the radio communication apparatus 20. At time t2, the radio communication apparatus 20 receives the signal which transfers the data $D_{t2}$, and, at the same time, transmits the signal which transfers the data $D_{t1}$ received from the communication apparatus 10 in the previous time slot. At time t2, the terminal apparatus 30 receives a synthesis signal constituted with the signal which transfers the data $D_{t1}$ transmitted from the radio communication apparatus 20 and the signal which transfers the data $D_{t2}$ transmitted from the communication control apparatus 10. Because the former of these signals is a desired signal, and the latter is an interference signal, the terminal apparatus 30 separates the respective signals from each other and acquires the desired signal based on a received power difference between the two signals. Then, also at time t3, data is transmitted and received in a similar manner to at time t2, and the terminal apparatus 30 separates the respective signals from each other and acquires the desired signal based on a received power difference between signals which respectively transfer the data $D_{t2}$ and $D_{t3}$.

5. OPERATION PROCESSING 5-1. Operation of the Whole System

Figure 8:
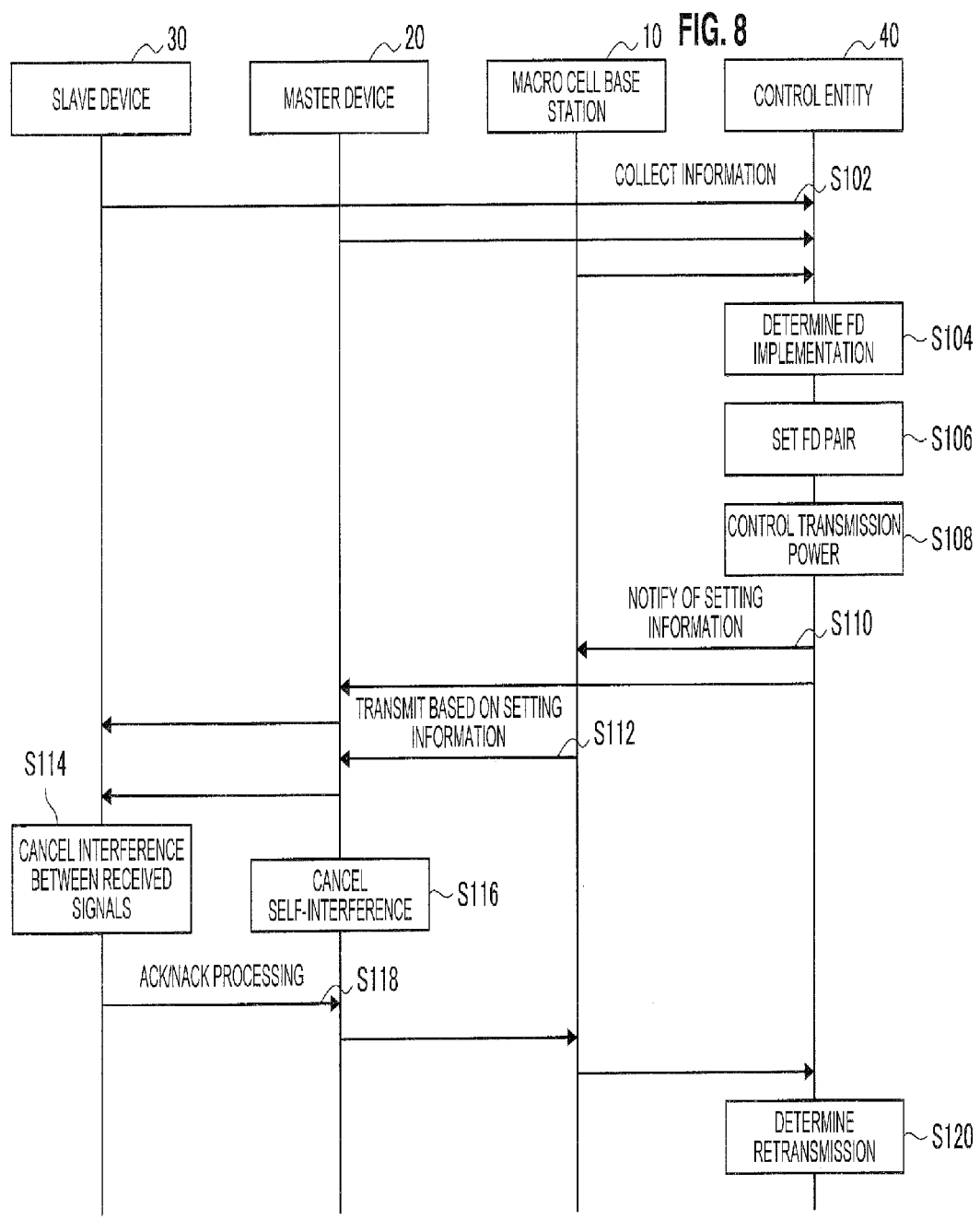
FIG. 8 is a sequence diagram illustrating an example of flow of communication control processing executed in a communication control system according to an embodiment of the present disclosure.

FIG. 8 is a sequence diagram illustrating an example of flow of communication control processing executed in the communication control system 1 according to the present embodiment. The sequence illustrated in FIG. 8 involves the communication control apparatus 10 as the macro cell base station, the radio communication apparatus 20 which is the master device of the small cell, the small cell terminal 30 and the control entity 40. It should be noted that the control entity 40 may be included in the communication control apparatus 10 as the cooperative control unit 144 as illustrated in FIG. 3.

As illustrated in FIG. 8, first, in step S102, the control entity 40 collects macro cell information from the communication control apparatus 10, master device information from the radio communication apparatus 20 and slave device information from the small cell terminal 30. For example, the control entity 40 collects load information such as a traffic amount, the number of terminals and a resource usage rate as information for determining whether the radio communication apparatus 20 should execute radio communication in the FD mode. Further, the control entity 40 collects capability information which indicates whether the small cell terminal 30 can use the interference cancellation technique based on the received power difference as information for selecting the terminal apparatus 30 with which the radio communication apparatus 20 is to perform radio communication in the FD mode. Further, the control entity 40 collects information indicating channel states of the radio backhaul link 22 and the access link 23 as information for selecting the small cell terminal 30 with which the radio communication apparatus 20 is to perform radio communication in the FD mode and information for transmission power control. A possible index indicating the channel states includes, for example, reference signal received power (RSRP), reference signal received quality (RSRQ), or the like. Collection of these information may be executed periodically or executed by being triggered by an event such as operation start of the small cell or movement of the radio communication apparatus 20 or the terminal apparatus 30.

Subsequently, in step S104, the control entity 40 determines whether the radio communication apparatus 20 should execute radio communication in the FD mode. For example, when load information indicating at least one of the traffic amount, the number of terminals and the resource usage rate indicates load exceeding a threshold, the control entity 40 determines that the radio communication apparatus 20 should execute radio communication in the FD mode, while, when the load information indicates load falling below the threshold, the control entity 40 determines that the radio communication apparatus 20 should execute radio communication in the non-FD mode.

When it is determined that the radio communication apparatus 20 should execute radio communication in the FD mode, in step S106, the control entity 40 sets the radio communication apparatus 20 and a small cell terminal with which the radio communication apparatus 20 is to perform radio communication in the FD mode as an FD pair. In step S108, the control entity 40 controls transmission power of the communication control apparatus 10 and the radio communication apparatus 20 so that the small cell terminal 30 can cancel interference using the interference cancellation technique based on the received power difference, that is, the received power difference becomes equal to or greater than the threshold. The processing executed in step S106 and S108 will be described in more detail later.

Subsequently, in step S110, the control entity 40 notifies the communication control apparatus 10, the radio communication apparatus 20 and the small cell terminal 30 of setting information indicating a control result in the above-described step S108. For example, the setting information includes information indicating the operation mode of the radio communication apparatus 20, transmission power information of the communication control apparatus 10 and the radio communication apparatus 20 and information indicating magnitude relationship of the received power at the small cell terminal. The communication control apparatus 10 and the radio communication apparatus 20 which receive this notification determine a power value indicated in the transmission power information as a power value of the transmission signal.

Subsequently, in step S112, the communication control apparatus 10 and the radio communication apparatus 20 generate transmission signals by modulating transmission data, and transmit the transmission signals at transmission power determined in the above-described step S110. At this time, a received power difference equal to or greater than the threshold occurs between the interference signal from the communication control apparatus 10 and the received signal from the radio communication apparatus 20 received by the small cell terminal 30 by control by the control entity 40 in the above-described step S108.

In step S114, the small cell terminal 30 acquires the desired signal by cancelling the interference signal using the interference cancellation technique based on the received power difference. The processing executed here will be described in more detail later.

Further, in step S116, the radio communication apparatus 20 cancels self-interference due to wraparound of the transmission signal from the received signal by utilizing the SIC technique.

Subsequently, in step S118, the small cell terminal 30, the radio communication apparatus 20 and the communication control apparatus 10 perform ACK/NACK processing. Subsequently, in step S120, the control entity 40 performs retransmission determination according to the received ACK/NACK response.

5-2. Setting of FD Pair and Transmission Power Control by Control Entity

Figure 9:
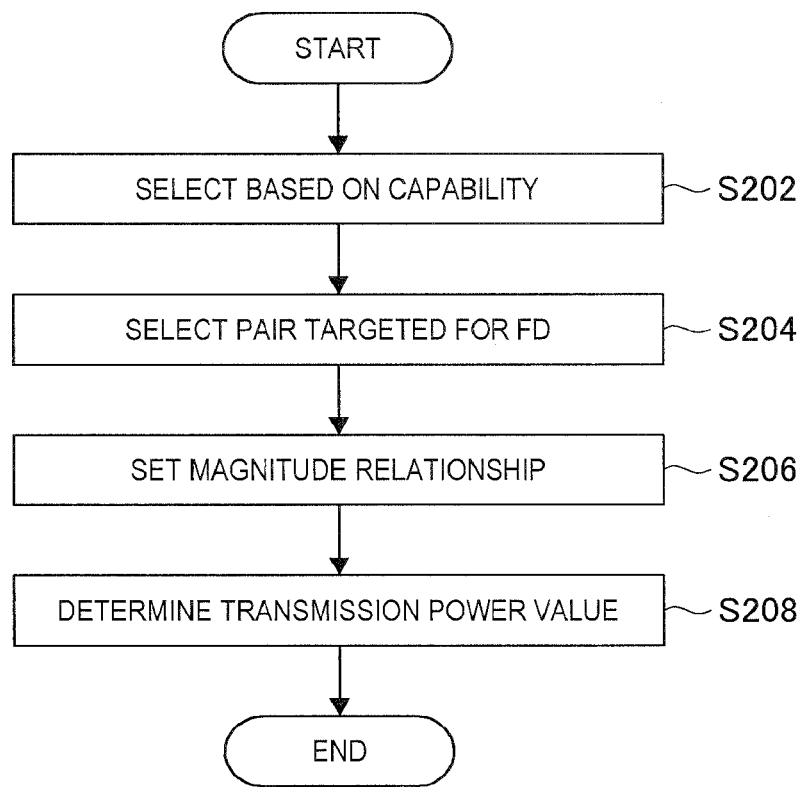
FIG. 9 is a flowchart illustrating an example of detailed flow of setting of an FD pair and transmission power control illustrated in FIG. 8.

FIG. 9 is a flowchart illustrating an example of detailed flow of the setting of an FD pair and the transmission power control illustrated in FIG. 8.

As illustrated in FIG. 9, first, in step S202, the control entity 40 selects candidates for the small cell terminal which receives a signal on the access link transmitted in the FD mode based on the capability information which indicates whether one or more small cell terminals 30 connected to the radio communication apparatus 20 can each use the interference cancellation technique based on the received power difference.

Subsequently, in step S204, the control entity 40 selects the small cell terminal 30 with which the radio communication apparatus 20 is to perform radio communication in the FD mode from the candidates selected in step S202. For details, the control entity 40 selects the small cell terminal 30 in positional relationship or radio wave conditions which can easily cause the received power difference, for example, in positional relationship or radio wave conditions where there is a large difference in channel states between the radio backhaul link 22 and the access link 23.

Subsequently, in step S206, the control entity 40 sets magnitude relationship of received power of the desired signal received from the radio communication apparatus 20 and the interference signal received from the communication control apparatus 10 at the small cell terminal 30. For details, the control entity 40 sets the magnitude relationship between the received power of the desired signal and the received power of the interference signal at the small cell terminal 30 by comparing the channel state of the radio backhaul link 22 with the channel state of the access link 23.

In step S208, the control entity 40 determines transmission power values of the communication control apparatus 10 and the radio communication apparatus 20. For details, the control entity 40 determines the transmission power of the communication control apparatus 10 and the transmission power value of the radio communication apparatus 20 based on the magnitude relationship set in the above-described step S206 and the channel states of the radio backhaul link 22 and the access link 23. At this time, the control entity 40 determines the respective transmission power values so that the small cell terminal 30 can cancel interference using the interference cancellation technique based on the received power difference, that is, the received power difference becomes equal to or greater than a threshold.

5-3. Interference Cancellation by Small Cell Terminal

Figure 10:
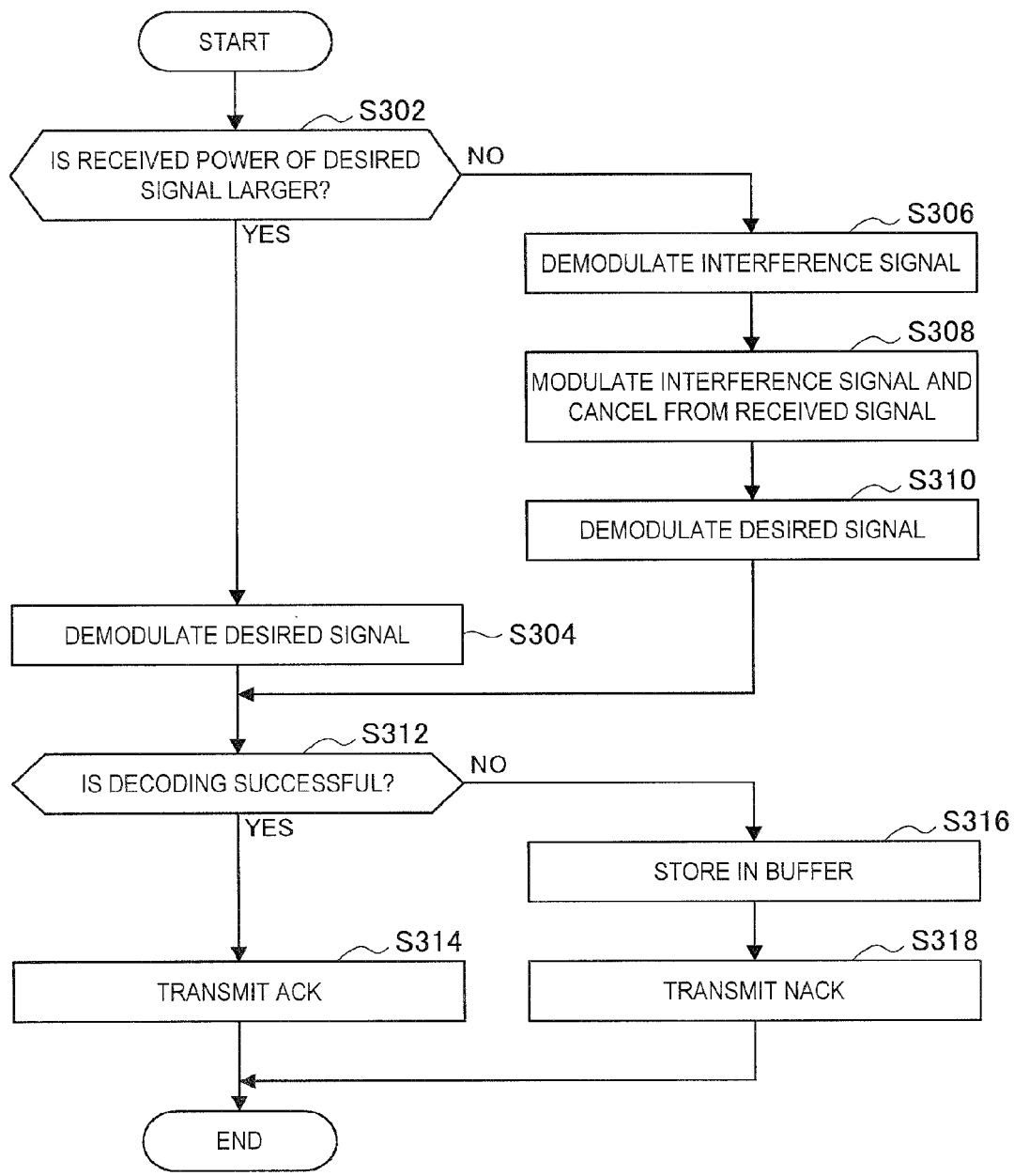
FIG. 10 is a flowchart illustrating an example of detailed flow of interference cancellation illustrated in FIG. 8.

FIG. 10 is a flowchart illustrating an example of detailed flow of the interference cancellation illustrated in FIG. 8.

As illustrated in FIG. 10, first, in step S302, the small cell terminal 30 determines which of the received power of the desired signal and the received signal of the interference signal is larger. The small cell terminal 30 determines which is larger by referring to information indicating the magnitude relationship of the received power included in the setting information notified from the control entity 40 (step S110 in FIG. 8).

When the received power of the desired signal is larger (S302/Yes), in step S304, the small cell terminal 30 demodulates the desired signal using a fact that a received power difference between the desired signal and the interference signal included in the received synthesis signal is equal to or greater than the threshold.

When the received power of the desired signal is smaller (S302/No), in step S306, the small cell terminal 30 demodulates the interference signal using a fact that the received power difference between the desired signal and the interference signal included in the received synthesis signal is equal to or greater than the threshold. Subsequently, in step S308, the small cell terminal 30 modulates the interference signal demodulated in step S306 and cancels the interference signal modulated from the received synthesis signal. In step S310, the small cell terminal 30 demodulates the desired signal from the signal from which the interference signal is cancelled in step S308.

Subsequently, in step S312, the small cell terminal 30 determines whether or not received data can be decoded from the acquired desired signal by executing, for example, error detection.

When the received data is successfully decoded (S312/Yes), in step S314, the small cell terminal 30 transmits an ACK response.

When decoding is failed (S312/No), in step S316, the small cell terminal 30 stores the received data in a buffer. The received stored in the buffer at this time can be used to decode the received data later in the above-described step S312. Subsequently, in step S318, the small cell terminal 30 transmits a NACK response.

6. SUPPLEMENT

Interference cancellation in one-to-one relationship between the radio communication apparatus 20 which is a master device of the small cell and the terminal apparatus 30 which is a slave device has been mainly described so far. In addition to this, the macro cell base station or the master device may multiplex transmission of signals to a plurality of terminals using the above-described NOMA technique. Further, the macro cell base station and the master device can also transmit desired signals to the terminal apparatuses 30 at the same time by applying capability of the interference cancellation technique based on the received power difference of the terminal apparatuses 30.

As an example, a case will be assumed where the macro cell base station 10 executes transmission to other macro cell terminals on the same channel at the same time in addition to transmission on the radio backhaul link 22 and transmission on the access link 23 toward the small cell terminal 30. In this case, the small cell terminal 30 receives signals addressed to other small cell terminals transmitted from the macro cell base station 10 on the same channel at the same time as the received signal from the master device 20 and the interference signal due to transmission from the macro cell base station 10 to the master device 20, as an interference signal (third received signal) by the radio communication unit 310. In such a case, the signal processing unit 320 can acquire the desired signal from the master device 20 by cancelling the interference signal due to transmission from the macro cell base station 10 to the master device 20 from the synthesis signal received by the radio communication unit 310 and further cancelling interference signals addressed to other small cell terminals using the interference cancellation technique based on the received power difference.

As another example, there is a possible case where the macro cell base station 10 executes direct transmission to the small cell terminals 30 on the same channel at the same time in addition to transmission on the backhaul link 22 and transmission on the access link 23 toward the small cell terminal 30. In this case, the small cell terminal 30 receives a received signal (fourth received signal) from the macro cell base station 10 by the radio communication unit 310 on the same channel at the same time as the received signal from the master device 20 and the interference signal due to transmission from the macro cell base station 10 to the master device 20. Therefore, the signal processing unit 320 separates and acquires the received signal from the master device 20 and the received signal from the macro cell base station 10 from the synthesis signal received by the radio communication unit 310 based on the received power difference between the signals. Here, the two received signals may respectively include packets which transfer different data, or may include packets which transfer the same data. When different data is received by the two received signals, throughput (data rate) is improved. On the other hand, when the same data is received by the two received signals, for example, by different redundancy versions (RV) being assigned to respective packets, it is possible to obtain transmission diversity and code diversity, so that it is possible to realize communication with high reliability.

7. APPLICATION EXAMPLES

The technology of the present disclosure is applicable to various products. For example, a cooperative control function of the communication control apparatus 10 may be realized as any type of server such as a tower server, a rack server, and a blade server. The cooperative control function may be a control module (such as an integrated circuit module including a single die, and a card or a blade that is inserted into a slot of a blade server) mounted on a server.

For example, the communication control apparatus 10 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the communication control apparatus 10 may be realized as any other types of base stations such as a NodeB and a base transceiver station (BTS).

The radio communication apparatus 20 may be also realized as any types of eNB or may be realized as other types of base stations such as a NodeB and the BTS. For example, the radio communication apparatus 20 and a terminal apparatus 30 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The radio communication apparatus 20 and the terminal apparatus 30 may also be realized as a terminal (that is also referred to as a machine type communication (MTC) terminal) that performs machine-to-machine (M2M) communication. Furthermore, the radio communication apparatus 20 and the terminal apparatus 300 may be a radio communication module (such as an integrated circuit module including a single die) mounted on each of the terminals.

7-1. Application Example Regarding Cooperative Control Node

Figure 11:
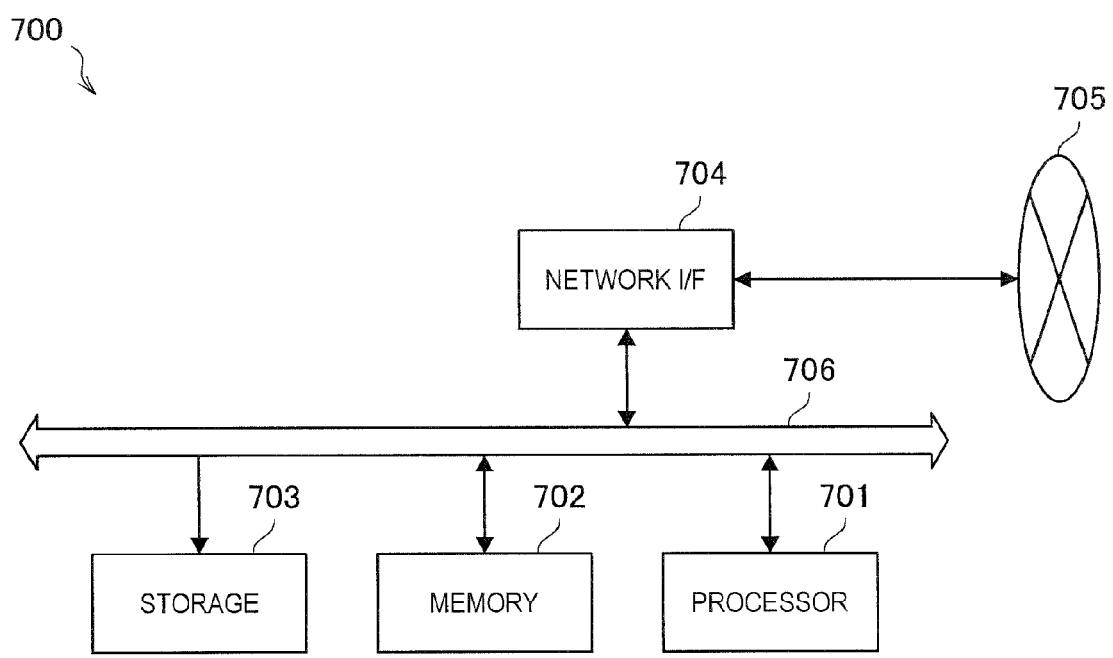
FIG. 11 is a block diagram illustrating an example of a schematic configuration of a server to which the technology according to the present disclosure may be applied.

FIG. 11 is a block diagram illustrating an example of a schematic configuration of a cooperative control server 700 to which the technology of the present disclosure may be applied. The cooperative control server 700 includes a processor 701, a memory 702, a storage 703, a network interface 704, and a bus 706.

The processor 701 may be, for example, a central processing unit (CPU) or a digital signal processor (DSP), and controls functions of the cooperative control server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the cooperative control server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the cooperative control server 700 illustrated in FIG. 11, the cooperative control unit 144 described using FIG. 3 may be implemented in the processor 701. For example, by the cooperative control server 700 controlling the operation mode of the master device of the small cell and transmission power of the macro cell base station and the master device, it is possible to use the interference cancellation technique based on the received power difference at the slave device.

7-2. Application Examples Regarding Base Station

Figure 12:
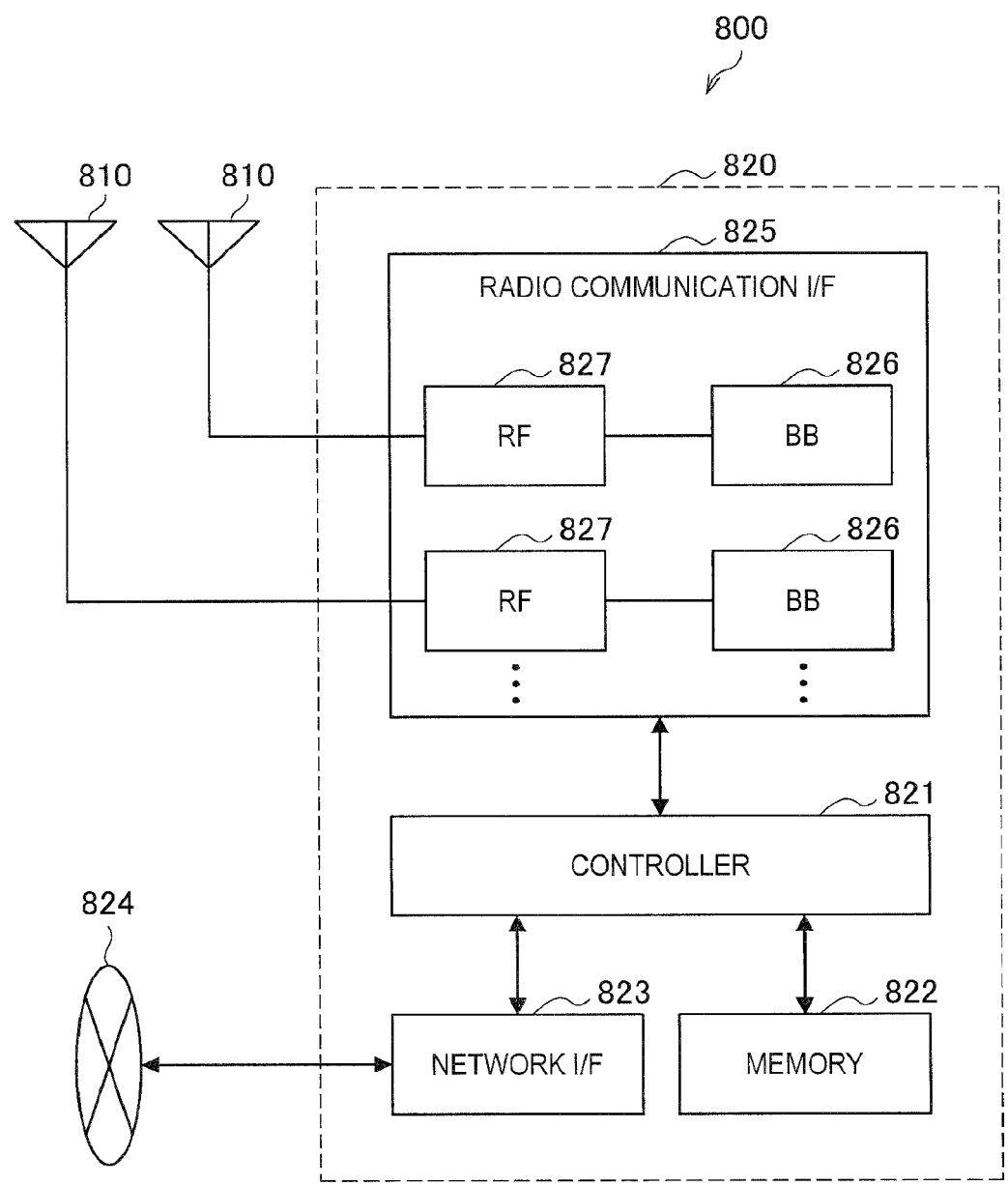
FIG. 12 is a block diagram illustrating a first example of a schematic configuration of an eNB to which the technology according to the present disclosure may be applied.

FIG. 12 is a block diagram illustrating an example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 12. For example, the multiple antennas 810 may be compatible with multiple frequency bands used by the eNB 800. Although FIG. 12 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an 51 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 12. For example, the multiple BB processors 826 may be compatible with multiple frequency bands used by the eNB 800. The radio communication interface 825 may include the multiple RF circuits 827, as illustrated in FIG. 12. For example, the multiple RF circuits 827 may be compatible with multiple antenna elements. Although FIG. 12 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 12, the cooperative control unit 144 described using FIG. 3 may be implemented at the controller 821. For example, by the eNB 800 controlling the operation mode of the master device of the small cell and transmission power of the eNB 800 and the master device, it is possible to use the interference cancellation technique based on the received power difference at the slave device.

7-3. Application Examples Regarding Terminal Apparatus

First Application Example

FIG. 13 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 13. Although FIG. 13 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 13. Although FIG. 13 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 13 via feeder lines, which are partially shown as dashed lines in the figure. The auxiliary controller 919 operates a minimum necessary function of the smartphone 900, for example, in a sleep mode.

The smartphone 900 illustrated in FIG. 13 can operate as the master device of the small cell. In this case, the smartphone 900 may have a function of the radio communication apparatus 20 described using FIG. 5. By this means, the smartphone 900 enables usage of the interference cancellation technique based on the received power difference at the slave device while enabling more efficient utilization of the radio resources by radio communication in the FD mode. Further, the smartphone 900 can operate as a slave device of the small cell. In this case, the smartphone 900 may have a function of the terminal apparatus 30 described using FIG. 6. By this means, the smartphone 900 can acquire a desired signal by cancelling interference from the received signal using the interference cancellation technique based on the received power difference.

Second Application Example

FIG. 14 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 14. Although FIG. 14 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 14. Although FIG. 14 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 14 via feeder lines that are partially shown as dashed lines in the figure. The battery 938 accumulates power supplied form the vehicle.

The car navigation apparatus 920 illustrated in FIG. 14 can operate as the master device of the small cell. In this case, the car navigation apparatus 920 may have a function of the radio communication apparatus 20 described using FIG. 5. By this means, the car navigation apparatus 920 enables usage of the interference cancellation technique based on the received power difference at the slave device while enabling more efficient utilization of radio resources by radio communication in the FD mode. Further, the car navigation apparatus 920 can operate as the slave device of the small cell. In this case, the car navigation apparatus 920 may have a function of the terminal apparatus 30 described using FIG. 6. By this means, the car navigation apparatus 920 can acquire a desired signal by cancelling interference from the received signal using the interference cancellation technique based on the received power difference.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

8. CONCLUSION

An embodiment of the technology according to the present disclosure has been described so far using FIG. 1 to FIG. 14. According to the above-described embodiment, at the master device which is connected to the base station via the radio backhaul link and which is connected to one or more terminals via the access link, communication in the full-duplex (FD) mode is performed. Further, the transmission power of the base station and the master device is controlled so that at the slave device, interference can be cancelled using the interference cancellation technique based on the received power difference. By this means, the slave device can acquire a desired signal from the master device by cancelling the interference signal due to transmission from the base station to the master device based on the received power difference. Therefore, in an environment where small cells are operated, it is possible to realize efficient utilization of radio resources by utilizing the FD mode and improve system capacity. For example, latency for relaying traffic is shortened. Further, because only a small memory size is required for the master device of the small cell to buffer traffic, it is possible to reduce cost for introducing the device.

Further, according to the above-described embodiment, the communication control apparatus 10 transmits a message indicating which of the received power of the desired signal and the received power of the interference signal is larger to the slave device via the master device. By this means, because the slave device can know which of the received power of the desired signal and the received power of the interference signal is larger, the slave device can acquire the desired signal from the received synthesis signal. For details, when the received power of the desired signal is larger than the received power of the interference signal, the slave device can demodulate the desired signal using a fact that the received power difference is equal to or greater than the threshold. On the other hand, when the received power of the desired signal is smaller than the received power of the interference signal, the slave device can demodulate the desired signal by cancelling the interference signal from the received synthesis signal using a fact that the received power difference is equal to or greater than the threshold.

Further, according to the above-described embodiment, the communication control apparatus 10 selects a slave device with which the master device is to perform communication in the FD mode based on the capability information indicating that the slave device can use the interference cancellation technique based on the received power difference. Further, the communication control apparatus 10 selects a slave device with which the master device is to perform communication in the FD mode further based on the channel state of the access link and the channel state of the radio backhaul link. By this means, the communication control apparatus 10 can utilize radio resources more efficiently by selecting an appropriate slave device and causing the master device to execute communication in the FD mode.

Further, according to the above-described embodiment, the communication control apparatus 10 determines which of the received power of the desired signal and the received power of the interference signal should be set larger by comparing the channel state of the radio backhaul link with the channel state of the access link. The communication control apparatus 10 can utilize radio resources more efficiently by setting magnitude relationship of the received power so that a received power difference can be easily provided using the comparison result of the channel states.

It should be noted that a series of control processing by each apparatus described in the present specification may be realized using software, hardware and any combination of software and hardware. A program constituting the software is stored in advance in a storage medium (non-transitory medium) provided inside or outside of each apparatus. Each program is, for example, loaded to a RAM when executed, and executed by a processor such as a CPU.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A radio communication apparatus including:

a radio communication unit configured to communicate via an access link with a master terminal connected to a base station via a radio backhaul link; and a signal processing unit configured to, when transmission on the radio backhaul link and transmission on the access link are executed on the same channel at the same time, cancel a second received signal due to transmission on the radio backhaul link, the second received signal interfering with a first received signal on the access link, using an interference cancellation technique based on a received power difference.

(2)

The radio communication apparatus according to (1), wherein, when received power of the second received signal is larger than received power of the first received signal, the signal processing unit cancels the second received signal from a synthesis signal received by the radio communication unit.

(3)

The radio communication apparatus according to (2), further including:

a control unit configured to determine which of the received power of the first received signal and the received power of the second received signal is larger based on a message indicating a control result by control entity controlling transmission power of the base station and the master terminal.

(4)

The radio communication apparatus according to (3), wherein the transmission power of the base station and the master terminal is controlled by the control entity so that a power difference between the received power of the first received signal and the received power of the second received signal is equal to or larger than a threshold.

(5)

The radio communication apparatus according to (3) or (4), wherein the control unit transmits capability information indicating that the radio communication apparatus is able to use the interference cancellation technique based on the received power difference to the master terminal via the radio communication unit, and wherein the capability information is used by the control entity to determine whether transmission on the radio backhaul link and on the access link is executed by the master terminal on the same channel at the same time.

(6)

The radio communication apparatus according to any one of (1) to (5), wherein, when a third received signal addressed to another apparatus interfering with the first received signal is received by the radio communication unit on the same channel at the same time as the first received signal and the second received signal, the signal processing unit further cancels the third received signal using the interference cancellation technique based on the received power difference.

(7)

The radio communication apparatus according to any one of (1) to (6), wherein, when a fourth received signal addressed to the radio communication apparatus is received by the radio communication unit on the same channel at the same time as the first received signal and the second received signal, the signal processing unit acquires the first received signal and the fourth received signal from a synthesis signal received by the radio communication unit based on a received power difference between the signals.

(8)

A communication control apparatus including:

a control unit configured to, when transmission from a base station to a master terminal on a radio backhaul link and transmission from the master terminal to a radio communication apparatus on an access link are executed on the same channel at the same time, control transmission power of the base station and transmission power of the master terminal so that the radio communication apparatus is able to cancel a second received signal due to transmission on the radio backhaul link, the second received signal interfering with a first received signal on the access link, using an interference cancellation technique based on a received power difference.

(9)

The communication control apparatus according to (8), wherein the control unit controls the transmission power of the base station and the transmission power of the master terminal so that a power difference between received power of the first received signal and received power of the second received signal at the radio communication apparatus is equal to or greater than a threshold.

(10)

The communication control apparatus according to (9), wherein the control unit determines which of the received power of the first received signal and the received power of the second received signal is to be set larger by comparing a channel state of the radio backhaul link with a channel state of the access link.

(11)

The communication control apparatus according to (10), wherein the channel state includes a distance or path loss between nodes at both ends of each link or channel quality of each link.

(12)

The communication control apparatus according to any one of (8) to (11), wherein the control unit causes the master terminal to transmit a message indicating which of the received power of the first received signal and the received power of the second received signal is larger to the radio communication apparatus.

(13)

The communication control apparatus according to any one of (8) to (12), wherein the control unit selects the radio communication apparatus which is to receive the first received signal from one or more terminals based on capability information indicating whether the one or more terminals connected to the master terminal are each able to use the interference cancellation technique based on the received power difference.

(14)

The communication control apparatus according to (13), wherein the control unit selects the radio communication apparatus which is to receive the first received signal from the one or more terminals further based on channel states of the access link and channel states of the backhaul link of the one or more terminals.

(15)

The communication control apparatus according to any one of (8) to (14), wherein, when load information indicating at least one of a traffic amount, the number of terminals and a resource usage rate indicates load exceeding a threshold, the control unit causes transmission on the radio backhaul link and transmission on the access link to be executed on the same channel at the same time.

(16)

A radio communication method in a radio communication apparatus which communicates via an access link with a master terminal connected to a base station via a radio backhaul link, the radio communication method including:

when transmission on the radio backhaul link and transmission on the access link are executed on the same channel at the same time, cancelling a second received signal due to transmission on the radio backhaul link, the second received signal interfering with a first received signal on the access link, using an interference cancellation technique based on a received power difference.

(17)

A communication control method including:

when transmission from a base station to a master terminal on a radio backhaul link and transmission from the master terminal to a radio communication apparatus on an access link are executed on the same channel at the same time, controlling transmission power of the base station and transmission power of the master terminal by a communication control apparatus so that the radio communication apparatus is able to cancel a second received signal due to transmission on the radio backhaul link, the second received signal interfering with a first received signal on the access link, using an interference cancellation technique based on a received power difference.

REFERENCE SIGNS LIST 10 communication control apparatus
110 radio communication unit
120 network communication unit
130 storage unit
140 control unit
142 macro cell control unit
144 cooperative control unit
20 radio communication apparatus
210 radio communication unit
220 self-interference processing unit
230 storage unit
240 control unit
30 terminal apparatus
310 radio communication unit
320 signal processing unit
330 storage unit
340 control unit

The invention claimed is:

1. A radio communication apparatus comprising:
a radio communication unit configured to communicate via an access link with a master terminal connected to a base station via a radio backhaul link; and a signal processing unit configured to, when transmission on the radio backhaul link and transmission on the access link are executed on the same channel at the same time, cancel a second received signal due to transmission on the radio backhaul link, the second received signal interfering with a first received signal on the access link, using an interference cancellation technique based on a received power difference.

2. The radio communication apparatus according to claim 1,
wherein, when received power of the second received signal is larger than received power of the first received signal, the signal processing unit cancels the second received signal from a synthesis signal received by the radio communication unit.

3. The radio communication apparatus according to claim 2, further comprising:
a control unit configured to determine which of the received power of the first received signal and the received power of the second received signal is larger based on a message indicating a control result by control entity controlling transmission power of the base station and the master terminal.

4. The radio communication apparatus according to claim 3,
wherein the transmission power of the base station and the master terminal is controlled by the control entity so that a power difference between the received power of the first received signal and the received power of the second received signal is equal to or larger than a threshold.

5. The radio communication apparatus according to claim 3,
wherein the control unit transmits capability information indicating that the radio communication apparatus is able to use the interference cancellation technique based on the received power difference to the master terminal via the radio communication unit, and
wherein the capability information is used by the control entity to determine whether transmission on the radio backhaul link and on the access link is executed by the master terminal on the same channel at the same time.

6. The radio communication apparatus according to claim 1,
wherein, when a third received signal addressed to another apparatus interfering with the first received signal is received by the radio communication unit on the same channel at the same time as the first received signal and the second received signal, the signal processing unit further cancels the third received signal using the interference cancellation technique based on the received power difference.

7. The radio communication apparatus according to claim 1,
wherein, when a fourth received signal addressed to the radio communication apparatus is received by the radio communication unit on the same channel at the same time as the first received signal and the second received signal, the signal processing unit acquires the first received signal and the fourth received signal from a synthesis signal received by the radio communication unit based on a received power difference between the signals.

8. A communication control apparatus comprising:
a control unit configured to, when transmission from a base station to a master terminal on a radio backhaul link and transmission from the master terminal to a radio communication apparatus on an access link are executed on the same channel at the same time, control transmission power of the base station and transmission power of the master terminal so that the radio communication apparatus is able to cancel a second received signal due to transmission on the radio backhaul link, the second received signal interfering with a first received signal on the access link, using an interference cancellation technique based on a received power difference.

9. The communication control apparatus according to claim 8,
wherein the control unit controls the transmission power of the base station and the transmission power of the master terminal so that a power difference between received power of the first received signal and received power of the second received signal at the radio communication apparatus is equal to or greater than a threshold.

10. The communication control apparatus according to claim 9,
wherein the control unit determines which of the received power of the first received signal and the received power of the second received signal is to be set larger by comparing a channel state of the radio backhaul link with a channel state of the access link.

11. The communication control apparatus according to claim 10,
wherein the channel state includes a distance or path loss between nodes at both ends of each link or channel quality of each link.

12. The communication control apparatus according to claim 8,
wherein the control unit causes the master terminal to transmit a message indicating which of the received power of the first received signal and the received power of the second received signal is larger to the radio communication apparatus.

13. The communication control apparatus according to claim 8,
wherein the control unit selects the radio communication apparatus which is to receive the first received signal from one or more terminals based on capability information indicating whether the one or more terminals connected to the master terminal are each able to use the interference cancellation technique based on the received power difference.

14. The communication control apparatus according to claim 13,
wherein the control unit selects the radio communication apparatus which is to receive the first received signal from the one or more terminals further based on channel states of the access link and channel states of the backhaul link of the one or more terminals.

15. The communication control apparatus according to claim 8,
wherein, when load information indicating at least one of a traffic amount, the number of terminals and a resource usage rate indicates load exceeding a threshold, the control unit causes transmission on the radio backhaul link and transmission on the access link to be executed on the same channel at the same time.

16. A radio communication method in a radio communication apparatus which communicates via an access link with a master terminal connected to a base station via a radio backhaul link, the radio communication method comprising:

when transmission on the radio backhaul link and transmission on the access link are executed on the same channel at the same time, cancelling a second received signal due to transmission on the radio backhaul link, the second received signal interfering with a first received signal on the access link, using an interference cancellation technique based on a received power difference.

17. A communication control method comprising:

when transmission from a base station to a master terminal on a radio backhaul link and transmission from the master terminal to a radio communication apparatus on an access link are executed on the same channel at the same time, controlling transmission power of the base station and transmission power of the master terminal by a communication control apparatus so that the radio communication apparatus is able to cancel a second received signal due to transmission on the radio backhaul link, the second received signal interfering with a first received signal on the access link, using an interference cancellation technique based on a received power difference.

* * * * *